US012693688B2

(12) United States Patent　　(10) Patent No.:　US 12,693,688 B2
He et al.　　(45) Date of Patent:　Jul. 28, 2026

(54) FLEET CONTROL METHOD

(71) Applicant: HAI ROBOTICS CO., LTD.,
Shenzhen (CN)

(72) Inventors: Jiawei He, Shenzhen (CN); **Hongxia
Zhou**, Shenzhen (CN)

(73) Assignee: HAI Robotics Co., Ltd., Shenzhen
(CN)

( * ) Notice: Subject to any disclaimer, the term of this
patent is extended or adjusted under 35
U.S.C. 154(b) by 197 days.

(21) Appl. No.: 18/397,193

(22) Filed: Dec. 27, 2023

(65) Prior Publication Data

US 2024/0126307 A1　　Apr. 18, 2024

Related U.S. Application Data

(63) Continuation of application No.
PCT/CN2022/097465, filed on Jun. 7, 2022.

(30) Foreign Application Priority Data

Jun. 30, 2021　(CN) .......................... 202110745074.8

(51) Int. Cl.
G05D 1/698　　(2024.01)
G05D 1/646　　(2024.01)
(Continued)

(52) U.S. Cl.
CPC ........... G05D 1/6985 (2024.01); G05D 1/646
(2024.01); G05D 2105/20 (2024.01);
(Continued)

(58) Field of Classification Search
None
See application file for complete search history.

(56) References Cited

U.S. PATENT DOCUMENTS 10,156,850 B1　12/2018　Ansari et al.
2015/0153738 A1　6/2015　Al-Buraiki et al.
(Continued)

FOREIGN PATENT DOCUMENTS

CN　　102915465 A　　2/2013
CN　　103587869 A　　2/2014
(Continued)

OTHER PUBLICATIONS

International Search Regort for PCT/CN2022/097465.
(Continued)

*Primary Examiner* — Jason Holloway
*Assistant Examiner* — Christopher A Buksa
(74) *Attorney, Agent, or Firm* — Slater Matsil, LLP

(57) ABSTRACT

This application provides a fleet control method and appa-
ratus, an electronic device, and a storage medium. The fleet
control method is used for controlling a robot fleet and
includes: determining a planned path of each robot in the
robot fleet, where the planned path of each robot is used to
indicate a movement path for the robot to move to a
corresponding target storage location within a shelving unit
region to execute a task; determining a following road
segment in the planned path of each following robot based
on the planned path of each robot, where the following road
segment includes a road segment located on the ground
and/or a road segment extending in a vertical direction; and
sending the following road segment to a corresponding
following robot.

15 Claims, 7 Drawing Sheets

(51) Int. Cl.

| | |
|---|---|
| *G05D 105/20* | (2024.01) |
| *G05D 107/70* | (2024.01) |
| *G05D 109/15* | (2024.01) |
| *G05D 111/30* | (2024.01) |

(52) U.S. Cl.
CPC ..... *G05D 2107/70* (2024.01); *G05D 2109/15* (2024.01); *G05D 2111/32* (2024.01)

(56) References Cited

U.S. PATENT DOCUMENTS

| 2017/0152106 A1* | 6/2017 | Hofmann ............. B65G 1/1378 |
|---|---|---|
| 2017/0308096 A1 | 10/2017 | Nusser et al. |
| 2018/0039258 A1 | 2/2018 | Zou |
| 2018/0039274 A1 | 2/2018 | Saibel |
| 2018/0057263 A1 | 3/2018 | Beer |
| 2018/0178382 A1* | 6/2018 | Lalonde ................. B25J 9/1666 |
| 2018/0321675 A1 | 11/2018 | Russell et al. |
| 2019/0176328 A1 | 6/2019 | Kichkaylo et al. |
| 2020/0257311 A1 | 8/2020 | Kim et al. |
| 2021/0341308 A1 | 11/2021 | Ivanov et al. |

FOREIGN PATENT DOCUMENTS

| CN | 104555222 A | 4/2015 |
|---|---|---|
| CN | 105022862 A | 11/2015 |
| CN | 105637544 A | 6/2016 |
| CN | 107003662 A | 8/2017 |
| CN | 107293110 A | 10/2017 |
| CN | 107941233 A | 4/2018 |
| CN | 108334535 A | 7/2018 |
| CN | 108664024 A | 10/2018 |
| CN | 108710991 A | 10/2018 |
| CN | 108931977 A | 12/2018 |
| CN | 109074080 A | 12/2018 |
| CN | 109178759 A | 1/2019 |
| CN | 109292343 A | 2/2019 |
| CN | 109410564 A | 3/2019 |
| CN | 109814556 A | 5/2019 |
| CN | 110021180 A | 7/2019 |
| CN | 110039543 A | 7/2019 |
| CN | 110119861 A | 8/2019 |
| CN | 110276945 A | 9/2019 |
| CN | 110516019 A | 11/2019 |
| CN | 110580038 A | 12/2019 |
| CN | 110645992 A | 1/2020 |
| CN | 110753300 A | 2/2020 |
| CN | 111121753 A | 5/2020 |
| CN | 111186682 A | 5/2020 |
| CN | 111213032 A | 5/2020 |
| CN | 111367284 A | 7/2020 |
| CN | 111369640 A | 7/2020 |
| CN | 111376950 A | 7/2020 |
| CN | 111445690 A | 7/2020 |
| CN | 111609848 A | 9/2020 |
| CN | 111656138 A | 9/2020 |
| CN | 111766879 A | 10/2020 |
| CN | 111984016 A | 11/2020 |
| CN | 112036773 A | 12/2020 |
| CN | 112068571 A | 12/2020 |
| CN | 112099491 A | 12/2020 |
| CN | 112180919 A | 1/2021 |
| CN | 112277942 A | 1/2021 |
| CN | 112461251 A | 3/2021 |
| CN | 112519777 A | 3/2021 |
| CN | 112540605 A | 3/2021 |
| CN | 112543958 A | 3/2021 |
| CN | 112633756 A | 4/2021 |
| CN | 112644946 A | 4/2021 |
| CN | 112685527 A | 4/2021 |
| CN | 112793979 A | 5/2021 |
| CN | 112817316 A | 5/2021 |
| CN | 112833890 A | 5/2021 |
| CN | 112859847 A | 5/2021 |
| CN | 112925308 A | 6/2021 |
| CN | 112966977 A | 6/2021 |
| CN | 112978189 A | 6/2021 |
| CN | 112978190 A | 6/2021 |
| CN | 113387098 A | 9/2021 |
| CN | 113387099 A | 9/2021 |
| CN | 113467449 A | 10/2021 |
| EP | 3618023 A1 | 3/2020 |
| JP | 2017146945 A | 8/2017 |
| JP | 2017167669 A | 9/2017 |
| JP | 2020083654 A | 6/2020 |
| KR | 1020190031431 A | 3/2019 |
| WO | WO2016172793 A1 | 11/2016 |
| WO | WO2019054208 A1 | 3/2019 |
| WO | WO2019216975 A1 | 11/2019 |
| WO | WO2020122953 A1 | 6/2020 |
| WO | WO2020233227 A1 | 11/2020 |
| WO | WO2021031441 A1 | 2/2021 |

OTHER PUBLICATIONS

The First Office Action issued on Jan. 14, 2025 for Japanese Patent Application No. 2023-580859.
The First Office Action issued on Mar. 17, 2025 for Korean Patent Application No. 10-2024-7000229.
Cited in the European Search Report for Application No. 22831638. 6, issued on Jul. 5, 2024.

\* cited by examiner

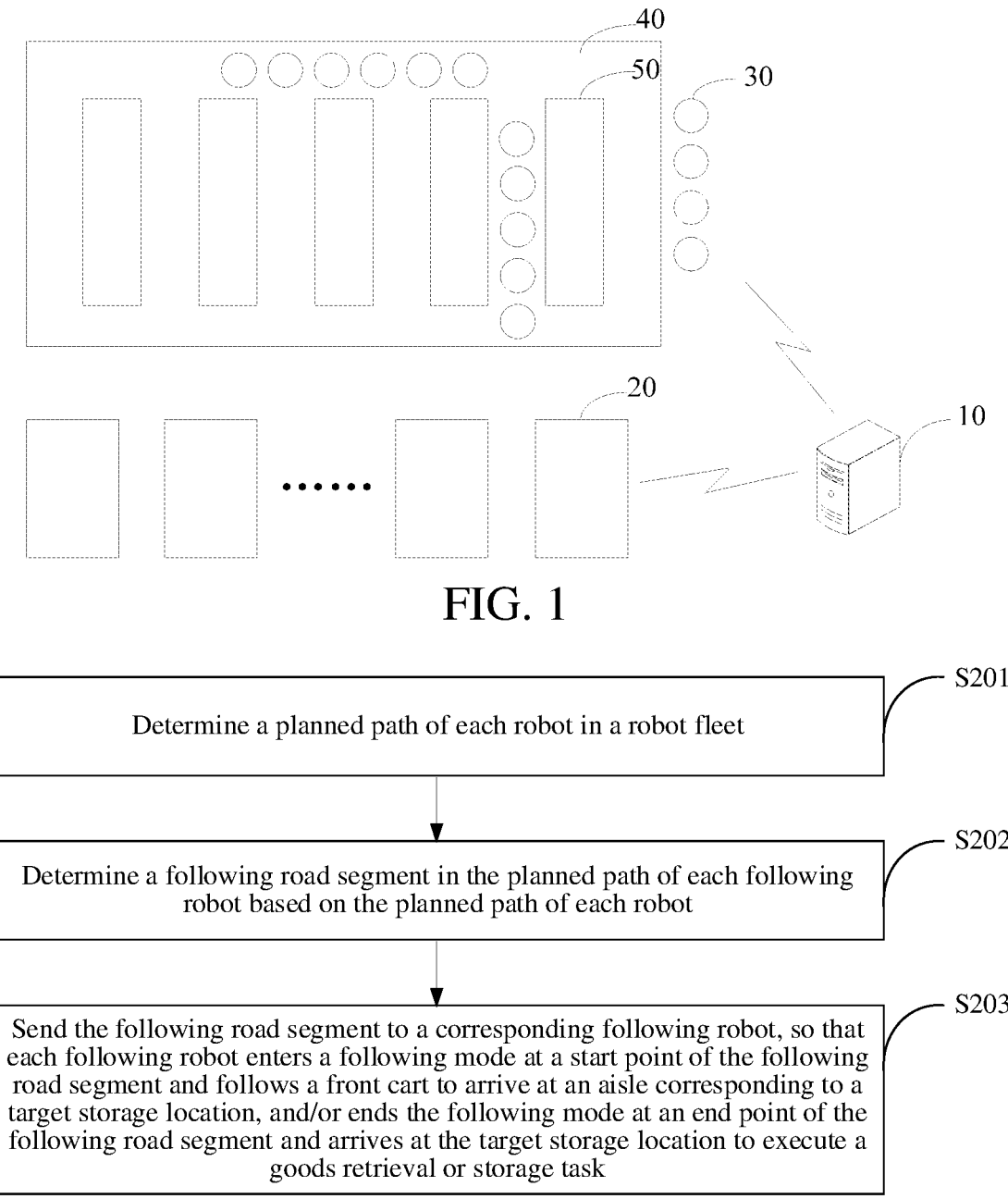

FIG. 1

S201
Determine a planned path of each robot in a robot fleet

S202
Determine a following road segment in the planned path of each following robot based on the planned path of each robot S203
Send the following road segment to a corresponding following robot, so that each following robot enters a following mode at a start point of the following road segment and follows a front cart to arrive at an aisle corresponding to a target storage location, and/or ends the following mode at an end point of the following road segment and arrives at the target storage location to execute a goods retrieval or storage task

FIG. 2

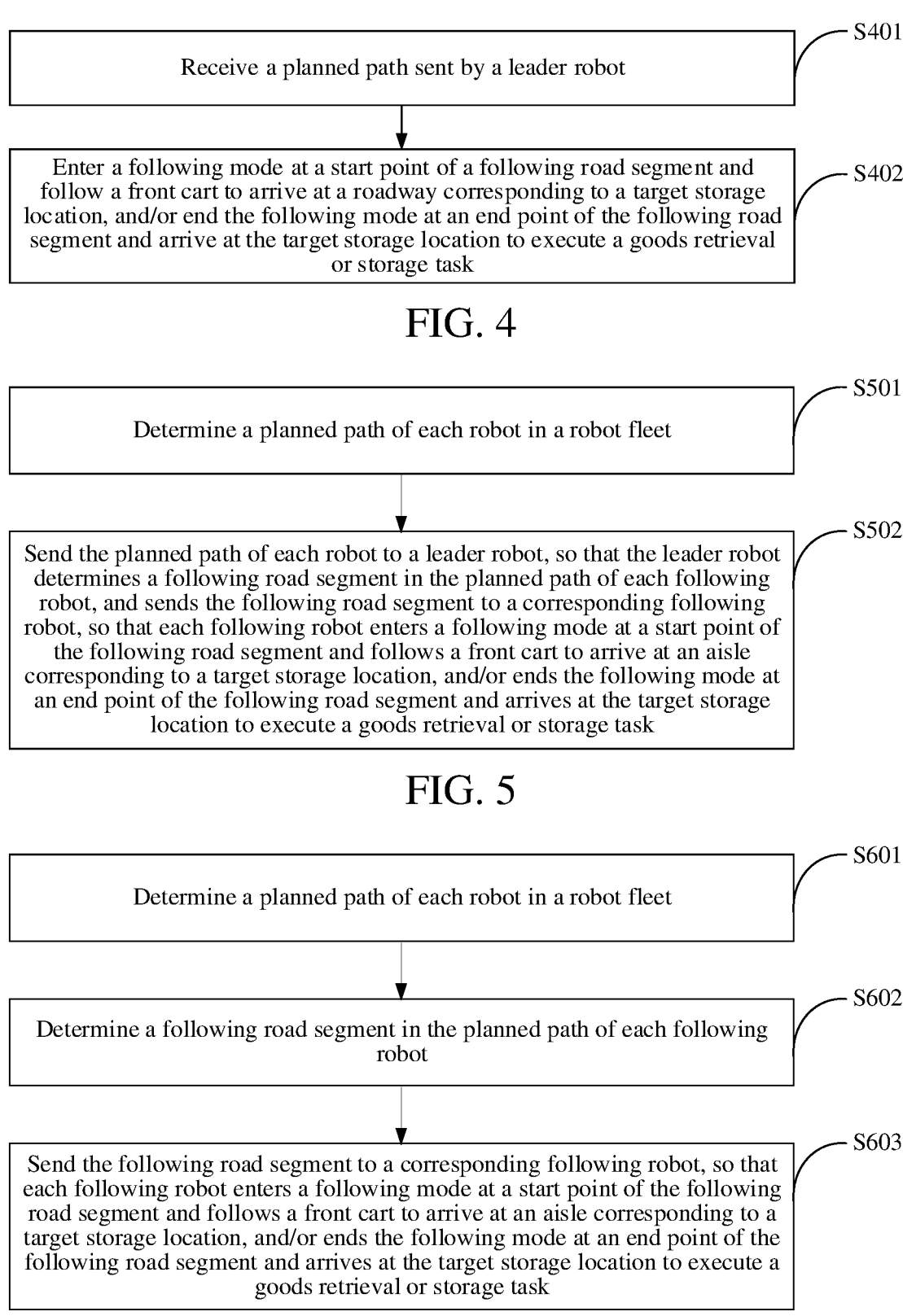

Receive a planned path sent by a leader robot    S401

Enter a following mode at a start point of a following road segment and follow a front cart to arrive at a roadway corresponding to a target storage location, and/or end the following mode at an end point of the following road segment and arrive at the target storage location to execute a goods retrieval or storage task    S402

FIG. 4

Determine a planned path of each robot in a robot fleet    S501

Send the planned path of each robot to a leader robot, so that the leader robot determines a following road segment in the planned path of each following robot, and sends the following road segment to a corresponding following robot, so that each following robot enters a following mode at a start point of the following road segment and follows a front cart to arrive at an aisle corresponding to a target storage location, and/or ends the following mode at an end point of the following road segment and arrives at the target storage location to execute a goods retrieval or storage task    S502

FIG. 5

Determine a planned path of each robot in a robot fleet    S601

Determine a following road segment in the planned path of each following robot    S602

Send the following road segment to a corresponding following robot, so that each following robot enters a following mode at a start point of the following road segment and follows a front cart to arrive at an aisle corresponding to a target storage location, and/or ends the following mode at an end point of the following road segment and arrives at the target storage location to execute a goods retrieval or storage task    S603

FIG. 6

FLEET CONTROL METHOD

CROSS-REFERENCE TO RELATED APPLICATIONS

This application is a continuation of International Patent Application No. PCT/CN2022/097465 filed on Jun. 7, 2022, which claims priority to Chinese Patent Application No. 202110745074.8, filed with China National Intellectual Property Administration on Jun. 30, 2021 and entitled "FLEET CONTROL METHOD AND APPARATUS, ELECTRONIC DEVICE, AND STORAGE MEDIUM", which is incorporated herein by reference in its entirety.

TECHNICAL FIELD

This application relates to the field of computer technologies, and in particular, to a fleet control method and apparatus, an electronic device, and a storage medium.

BACKGROUND

In the traditional warehousing industry, carrying of goods requires large labor and time costs. In order to reduce the labor costs, autonomous mobile devices dedicated for carrying of goods have emerged based on intelligent control technologies. These autonomous mobile devices, also known as robot carts, can autonomously climb shelving units, pick up goods, and transport goods, greatly improving carrying efficiency of goods in warehouses.

These robot carts usually operate independently and can move freely within a working region. As warehousing scales become larger, more robot cars are used. A system requires an enormous calculation capability to control the robot carts in real time, resulting in an excessive pressure in the system.

SUMMARY

This application provides a fleet control method and apparatus, an electronic device, and a storage medium, to resolve a problem of large calculating pressure of a warehousing system.

According to a first aspect, this application provides a fleet control method. The method is used for controlling a robot fleet, the robot fleet includes a leader robot and at least one following robot, the method is applicable to the leader robot, and the method includes:

determining a planned path of each robot in the robot fleet, where the planned path of each robot is used to indicate a movement path for the robot to move to a corresponding target storage location within a shelving unit region to execute a task;

determining a following road segment in the planned path of each following robot based on the planned path of each robot, where the following road segment includes a road segment located on the ground and/or a road segment extending in a vertical direction; and sending the following road segment to a corresponding following robot, so that each following robot enters a following mode at a start point of the following road segment and follows a front cart to arrive at a roadway corresponding to the target storage location, and/or ends the following mode at an end point of the following road segment and arrives at the target storage location to execute a goods retrieval or storage task.

Optionally, each shelving unit is provided with a plurality of vertical tracks for the robot to climb, a plurality of layers of storage locations are arranged corresponding to each of the vertical tracks, and the target storage locations corresponding to the robots in the robot fleet are in the same aisle.

The determining a planned path of each robot in the robot fleet includes: receiving to-be-executed tasks of the robot fleet sent by a server, where a number of the tasks matches a number of the robots in the robot fleet;

assigning a task to each robot based on a depth of the vertical track where the target storage location corresponding to each of the to-be-executed tasks is located, a height of the target storage location, and a position sequence of each robot in the robot fleet, where the depth corresponding to the vertical track is a distance between the vertical track and an aisle entrance; and determining the planned path of each robot based on the depth of the vertical track corresponding to the task assigned to the robot and the height of the target storage location.

Optionally, each shelving unit is provided with a plurality of vertical tracks for the robot to climb, a plurality of layers of storage locations are arranged corresponding to each of the vertical tracks, and the target storage locations corresponding to each robot in the robot fleet are in the same aisle. The method further includes:

receiving to-be-executed tasks of the leader robot sent by a server, where the task is sent by the server after assigning the task to each robot based on a depth of the vertical track where the target storage location corresponding to each of the to-be-executed tasks of the robot fleet is located, a height of the target storage location, and a position sequence of each robot in the robot fleet, and the depth corresponding to the vertical track is a distance between the vertical track and an aisle entrance; and The determining a planned path of each robot in the robot fleet includes:

receiving the planned path of each robot sent by the server, where the planned path is determined by the server based on the depth of the vertical track corresponding to the task assigned to the robot and the height of the target storage location.

Optionally, the assigning a task to each robot based on a depth of the vertical track where the target storage location corresponding to each of the to-be-executed tasks is located, a height of the target storage location, and a position sequence of each robot in the robot fleet includes:

dividing the robot fleet into a plurality of sub-fleets based on the depths of the vertical tracks where the target storage locations corresponding to the to-be-executed tasks are located;

assigning the to-be-executed tasks corresponding to the same vertical track to one of the sub-fleets; and assigning, for each sub-fleet, the to-be-executed tasks with the corresponding target storage locations in descending order of heights to the robots located from front to rear within the sub-fleet.

Optionally, the determining the planned path of each robot based on the depth of the vertical track corresponding to the task assigned to the robot and the height of the target storage location includes:

planning first paths for the robots in each sub-fleet to arrive at the vertical tracks based on the depths of the vertical tracks where the target storage locations corresponding to the to-be-executed tasks are located; and planning, for each sub-fleet, second paths for the robots to arrive at the target storage locations based on the heights of the target storage locations corresponding to the to-be-executed tasks.

Optionally, the method further includes:

sending traveling state information of a current cart to a rear cart in real time within the following road segment, so that the rear cart adjusts a steering angle based on the traveling state information of the leader robot after a preset time interval, to follow the leader robot.

Optionally, the method further includes:

sharing traveling state information of the leader robot in real time within the following road segment through a self-organized fleet network, so that the following robots in the fleet adjust a steering angle based on the traveling state information of the leader robot after a time of $(N-1)$ T, to follow the front carts, where N is an order-position of each robot in the fleet, and T is a preset time interval.

Optionally, the method further includes:

receiving a grouping signal sent by the server, where the grouping signal includes grouping time information and grouping location information;

arriving at a grouping location based on the grouping signal;

sending arrival moment information to the server, so that the server determines the position sequence of each robot in the fleet based on the arrival moment information and the arrival moment information of other robots in the fleet, determines a role of each robot in the fleet based on the position sequence of the robots in the fleet, and sends role identification information to each robot;

receiving the role identification information sent by the server; and determining that a current cart is the leader robot after the role identification information corresponding to the leader robot is received.

Optionally, the method further includes:

receiving a grouping signal sent by the server, where the grouping signal includes grouping time information and grouping location information;

arriving at a grouping location based on the grouping signal;

detecting whether another robot exists at the grouping location;

determining that a current cart is the leader robot if no another robot exists at the grouping location; and sending a serial number of the current cart and the role identification information corresponding to the leader robot to the server, so that the server determines a role and a position sequence of each robot in the fleet based on the role identification information of the current cart and the role identification information sent by other robots belonging to the same robot fleet as the current cart.

According to a second aspect, this application provides a fleet control method. The method is used for controlling a robot fleet, the robot fleet includes a leader robot and at least one following robot, the method is applicable to the following robot, and the method includes:

receiving a planned path sent by the leader robot, where the planned path is sent by the leader robot after determining the planned path of each robot in the robot fleet and determining a following road segment in the robot planning path of each following robot based on the planned path of each robot, the planned path of each robot is used to indicate a movement path for the robot to move to a corresponding target storage location within a shelving unit region to execute a task, and the following road segment includes a road segment located on the ground and/or a road segment extending in a vertical direction; and entering a following mode at a start point of the following road segment and following a front cart to arrive at an aisle corresponding to the target storage location, and/or ending the following mode at an end point of the following road segment and arriving at the target storage location to execute a goods retrieval or storage task.

Optionally, the method further includes:

receiving traveling state information sent by the front cart in real time within the following road segment;

updating a relevant parameter of a current cart based on the traveling state information of the front cart after a preset time interval to follow the front cart;

and/or sending traveling state information of the current cart to a rear cart in real time, so that the rear cart updates the relevant parameter of the current cart based on the traveling state information after the preset time interval to follow the front cart.

Optionally, the entering a following mode at a start point of the following road segment and following a front cart to arrive at an aisle corresponding to the target storage location, and/or ending the following mode at an end point of the following road segment and arriving at the target storage location to execute a goods retrieval or storage task includes:

extending a connecting mechanism forward at the start point of the following road segment to connect to the front cart, and following the front cart to arrive at the aisle corresponding to the target storage location;

and/or cutting off the connection from the front cart at the end point of the following road segment, retracting the connecting mechanism, and arriving at the target storage location to execute the goods retrieval or storage task.

Optionally, the entering a following mode at a start point of the following road segment and following a front cart to arrive at an aisle corresponding to the target storage location includes:

detecting a distance to the front cart through a sensor in real time from the start point of the following road segment; and adjusting a movement state of a current cart in real time based on a detected distance to the front cart and a preset distance range, to maintain the distance to the front cart within the preset distance range, and following the front cart to arrive at the aisle corresponding to the target storage location.

Optionally, the method further includes:

receiving a grouping signal sent by the server, where the grouping signal includes grouping time information and grouping location information;

arriving at a grouping location based on the grouping signal;

sending arrival moment information to the server, so that the server determines the position sequence of each robot in the fleet based on the arrival moment information and the arrival moment information of other robots in the fleet, determines a role of each robot in the fleet based on the position sequence of the robots in the fleet, and sends role identification information to each robot;

receiving the role identification information sent by the server; and determining that the current cart is the following robot after the role identification information corresponding to the following robot is received.

Optionally, the method further includes:

receiving a grouping signal sent by the server, where the grouping signal includes grouping time information and grouping location information;

arriving at a grouping location based on the grouping signal;

detecting whether another robot exists at the grouping location;

determining that the current cart is the following robot if another robot exists at the grouping location; and sending a serial number of the current cart and the role identification information corresponding to the following robot to the server, so that the server determines a role and a position sequence of each robot in the fleet based on the role identification information sent by each robot.

According to a third aspect, this application provides a fleet control method. The method is used for controlling a robot fleet, the robot fleet includes a leader robot and at least one following robot, the method is applicable to a server, and the method includes:

determining a planned path of each robot in the robot fleet, where the planned path of each robot is used to indicate a movement path for the robot to move to a corresponding target storage location within a shelving unit region to execute a task; and sending the planned path of each robot to the leader robot, so that the leader robot determines a following road segment in the planned path of each following robot, and sends the following road segment to a corresponding following robot, so that each following robot enters a following mode at a start point of the following road segment and follows a front cart to arrive at an aisle corresponding to the target storage location, and/or ends the following mode at an end point of the following road segment and arrives at the target storage location to execute a goods retrieval or storage task, where the following road segment includes a road segment located on the ground and/or a road segment extending in a vertical direction.

Optionally, the method further includes:

sending a grouping signal to a plurality of robots, so that the robots arrive at a grouping location based on the grouping signal, where the grouping signal includes grouping time information and grouping location information;

receiving arrival moment information sent by the robots;

determining a position sequence of a corresponding robot in the fleet based on the arrival moment information sent by the robots; and determining a role of each robot in the fleet based on the position sequence of each robot in the fleet, and sending role identification information to each robot.

Optionally, the method further includes:

sending a grouping signal to a plurality of robots, where the grouping signal includes grouping time information and grouping location information.

receiving serial numbers of the current carts and corresponding role identification information sent by the robots, where the serial numbers of the current carts and the corresponding role identification information are sent by the robots after arriving at the grouping location based on the grouping signal, detecting whether another robot exists at the grouping location, and determining roles of the current carts; and determining a role and a position sequence of each robot in the fleet based on the role identification information of each robot.

According to a fourth aspect, this application provides a fleet control method. The method is used for controlling a robot fleet, the robot fleet includes a leader robot and at least one following robot, the method is applicable to a server, and the method includes:

determining a planned path of each robot in the robot fleet, where the planned path of each robot is used to indicate a movement path for the robot to move to a corresponding target storage location within a shelving unit region to execute a task;

determining a following road segment in the planned path of each following robot, where the following road segment includes a road segment located on the ground and/or a road segment extending in a vertical direction; and sending the following road segment to a corresponding following robot, so that each following robot enters a following mode at a start point of the following road segment and follows a front cart to arrive at an aisle corresponding to the target storage location, and/or ends the following mode at an end point of the following road segment and arrives at the target storage location to execute a goods retrieval or storage task.

Optionally, the method further includes:

sending a grouping signal to a plurality of robots, so that the robots arrive at a grouping location based on the grouping signal, where the grouping signal includes grouping time information and grouping location information;

receiving arrival moment information sent by the robots;

determining a position sequence of a corresponding robot in the fleet based on the arrival moment information sent by the robots; and determining a role of each robot in the fleet based on the position sequence of each robot in the fleet, and sending role identification information to each robot.

Optionally, the method further includes:

sending a grouping signal to a plurality of robots, where the grouping signal includes grouping time information and grouping location information.

receiving serial numbers of the current carts and corresponding role identification information sent by the robots, where the serial numbers of the current carts and the corresponding role identification information are sent by the robots after arriving at the grouping location based on the grouping signal, detecting whether another robot exists at the grouping location, and determining roles of the current carts; and determining a role and a position sequence of each robot in the fleet based on the role identification information of each robot.

According to a fifth aspect, this application further provides a fleet control apparatus, including:

a planned path determining module, configured to determine a planned path of each robot in a robot fleet, where the planned path of each robot is used to indicate a movement path for the robot to move to a corresponding target storage location within a shelving unit region to execute a task;

a following road segment determining module, configured to determine a following road segment in the planned path of each following robot based on the planned path of each robot, where the following road segment includes a road segment located on the ground and/or a road segment extending in a vertical direction; and a sending module, configured to send the following road segment to a corresponding following robot, so that each following robot enters a following mode at a start point of the following road segment and follows a front cart to arrive at an aisle corresponding to the target storage location, and/or ends the following mode at an end point of the following road segment and arrives at the target storage location to execute a goods retrieval or storage task.

Optionally, each shelving unit is provided with a plurality of vertical tracks for the robot to climb, a plurality of layers of storage locations are arranged corresponding to each of the vertical tracks, and the target storage locations corresponding to the robots in the robot fleet are in the same aisle.

The planned path determining module is specifically configured to:

receive to-be-executed tasks of the robot fleet sent by a server, where a number of the tasks matches a number of the robots in the robot fleet;

assign a task to each robot based on a depth of the vertical track where the target storage location corresponding to each of the to-be-executed tasks is located, a height of the target storage location, and a position sequence of each robot in the robot fleet, where the depth corresponding to the vertical track is a distance between the vertical track and an aisle entrance; and determine the planned path of each robot based on the depth of the vertical track corresponding to the task assigned to the robot and the height of the target storage location.

Optionally, each shelving unit is provided with a plurality of vertical tracks for the robot to climb, a plurality of layers of storage locations are arranged corresponding to each of the vertical tracks, and the target storage locations corresponding to the robots in the robot fleet are in the same aisle.

The apparatus further includes: a receiving module, configured to receive to-be-executed tasks of the leader robot sent by a server, where the task is sent by the server after assigning the task to each robot based on a depth of the vertical track where the target storage location corresponding to each of the to-be-executed tasks of the robot fleet is located, a height of the target storage location, and a position sequence of each robot in the robot fleet, and the depth corresponding to the vertical track is a distance between the vertical track and an aisle entrance; and The planned path determining module is specifically configured to:

receive the planned path of each robot sent by the server, where the planned path is determined by the server based on the depth of the vertical track corresponding to the task assigned to the robot and the height of the target storage location.

Optionally, during the assignment of the task to each robot based on the depth of the vertical track where the target storage location corresponding to each of the to-be-executed tasks is located, the height of the target storage location, and the position sequence of each robot in the robot fleet, the planned path determining module is specifically configured to:

divide the robot fleet into a plurality of sub-fleets based on the depths of the vertical tracks where the target storage locations corresponding to the to-be-executed tasks are located;

assign the to-be-executed tasks corresponding to the same vertical track to one of the sub-fleets; and assign, for each sub-fleet, the to-be-executed tasks with the corresponding target storage locations in descending order of heights to the robots located from front to rear within the sub-fleet.

Optionally, during the determination of the planned path of each robot based on the depth of the vertical track corresponding to the task assigned to the robot and the height of the target storage location, the planned path determining module is specifically configured to:

plan first paths for the robots in each sub-fleet to arrive at the vertical tracks based on the depths of the vertical tracks where the target storage locations corresponding to the to-be-executed tasks are located; and plan, for each sub-fleet, second paths for the robots to arrive at the target storage locations based on the heights of the target storage locations corresponding to the to-be-executed tasks.

Optionally, the sending module is further configured to:

sending traveling state information of a current cart to a rear cart in real time within the following road segment, so that the rear cart adjusts a steering angle based on the traveling state information of the leader robot after a preset time interval, to follow the leader robot.

Optionally, the sending module is further configured to:

share traveling state information of the leader robot in real time within the following road segment through a self-organized fleet network, so that the following robots in the fleet adjust a steering angle based on the traveling state information of the leader robot after a time of $(N-1)\,T$, to follow the front carts, where N is an order-position of each robot in the fleet, and T is a preset time interval.

Optionally, the apparatus further includes:

a receiving module, configured to receive a grouping signal sent by the server, where the grouping signal includes grouping time information and grouping location information;

a movement module, configured to arrive at a grouping location based on the grouping signal, where the sending module is further configured to send arrival moment information to the server, so that the server determines the position sequence of each robot in the fleet based on the arrival moment information and the arrival moment information of other robots in the fleet, determines a role of each robot in the fleet based on the position sequence of the robots in the fleet, and sends role identification information to each robot;

the receiving module is further configured to receive the role identification information sent by the server; and a role determining module, configured to determine that a current cart is the leader robot after the role identification information corresponding to the leader robot is received.

Optionally, the apparatus further includes:

a receiving module, configured to receive a grouping signal sent by the server, where the grouping signal includes grouping time information and grouping location information;

a movement module, configured to arrive at a grouping location based on the grouping signal;

a detection module, configured to detect whether another robot exists at the grouping location; and a role determining module, configured to determine that a current cart is the leader robot if no another robot exists at the grouping location.

The sending module is further configured to send a serial number of the current cart and the role identification information corresponding to the leader robot to the server, so that the server determines a role and a position sequence of each robot in the fleet based on the role identification information of the current cart and the role identification information sent by another robot belonging to the same robot fleet as the current cart.

According to a sixth aspect, this application further provides a fleet control apparatus, including:

a receiving module, configured to receive a planned path sent by a leader robot, where the planned path is sent by the leader robot after determining the planned path of each robot in the robot fleet and determining a following road segment in the planning path of each following robot based on the planned path of each robot, the planned path of each robot is used to indicate a movement path for the robot to move to a corresponding target storage location within a shelving unit region to execute a task, and the following road segment includes a road segment located on the ground and/or a road segment extending in a vertical direction; and a following module, configured to enter a following mode at a start point of the following road segment and follow a front cart to arrive at an aisle corresponding to the target storage location, and/or end the following mode at an end point of the following road segment and arriving at the target storage location to execute a goods retrieval or storage task.

Optionally, the receiving module is configured to receive traveling state information sent by the front cart in real time within the following road segment.

The apparatus further includes: a parameter updating module, configured to update a relevant parameter of a current cart based on the traveling state information of the front cart after a preset time interval to follow the front cart; and/or the apparatus further includes: a sending module, configured to send traveling state information of the current cart to a rear cart in real time, so that the rear cart updates w relevant parameter of the current cart based on the traveling state information of the front cart after the preset time interval to follow the front cart.

Optionally, the following module is specifically configured to:

extend a connecting mechanism forward at the start point of the following road segment to connect to the front cart, and follow the front cart to arrive at the roadway corresponding to the target storage location; and/or cut off the connection from the front cart at the end point of the following road segment, retract the connecting mechanism, and arrive at the target storage location to execute the goods retrieval or storage task.

Optionally, during the entry of the following mode at the start point of the following road segment and the following with the front cart to arrive at the aisle corresponding to the target storage location, the following module is specifically configured to:

detect a distance to the front cart through a sensor in real time from the start point of the following road segment; and adjust a movement state of a current cart in real time based on a detected distance to the front cart and a preset distance range, to maintain the distance to the front cart within the preset distance range, and follow the front cart to arrive at the aisle corresponding to the target storage location.

Optionally, the receiving module is further configured to receive a grouping signal sent by the server, where the grouping signal includes grouping time information and grouping location information.

The apparatus further includes:

a movement module, configured to arrive at a grouping location based on the grouping signal.

The sending module is further configured to send arrival moment information to the server, so that the server determines the position sequence of each robot in the fleet based on the arrival moment information and the arrival moment information of other robots in the fleet, determines a role of each robot in the fleet based on the position sequence of the robots in the fleet, and sends role identification information to each robot.

The receiving module is further configured to receive the role identification information sent by the server.

The apparatus further includes:

a role determining module, configured to determine that the current cart is the following robot after the role identification information corresponding to the following robot is received.

Optionally, the receiving module is configured to receive a grouping signal sent by the server, where the grouping signal includes grouping time information and grouping location information.

The apparatus further includes:

a movement module, configured to arrive at a grouping location based on the grouping signal.

a detection module, configured to detect whether another robot exists at the grouping location; and a role determining module, configured to determine that the current cart is the following robot if another robot exists at the grouping location.

The sending module is further configured to send a serial number of the current cart and the role identification information corresponding to the following robot to the server, so that the server determines a role and a position sequence of each robot in the fleet based on the role identification information of sent by each robot.

According to a seventh aspect, this application further provides a fleet control apparatus, including:

a path planning module, configured to determine a planned path of each robot in a robot fleet, where the planned path of each robot is used to indicate a movement path for the robot to move to a corresponding target storage location within a shelving unit region to execute a task; and a sending module, configured to send the planned path of each robot to the leader robot, so that the leader robot determines a following road segment in the planned path of each following robot, and sends the following road segment to a corresponding following robot, so that each following robot enters a following mode at a start point of the following road segment and follows a front cart to arrive at an aisle corresponding to the target storage location, and/or ends the following mode at an end point of the following road segment and arrives at the target storage location to execute a goods retrieval or storage task, where the following road segment includes a road segment located on the ground and/or a road segment extending in a vertical direction.

Optionally, the sending module is further configured to send a grouping signal to a plurality of robots, so that the robots arrive at a grouping location based on the grouping signal, where the grouping signal includes grouping time information and grouping location information.

The apparatus further includes:

a receiving module, configured to receive arrival moment information sent by the robots;

a location determining module, configured to determine a place of a corresponding robot in the fleet based on the arrival moment information sent by the robots; and a role determining module, configured to determine a role of each robot in the fleet based on the position sequence of each robot in the fleet, and send role identification information to each robot.

Optionally, the sending module is further configured to send a grouping signal to a plurality of robots, where the grouping signal includes grouping time information and grouping location information.

The apparatus further includes:

a receiving module, configured to receive serial numbers of the current carts and corresponding role identification information sent by the robots, where the serial numbers of the current carts and the corresponding role identification information are sent by the robots after arriving at the grouping location based on the grouping signal, detecting whether another robot exists at the grouping location, and determining roles of the current carts; and a role determining module, configured to a role and a position sequence of each robot in the fleet based on the role identification information of each robot.

According to an eighth aspect, this application further provides a fleet control apparatus, including:

a path planning module, configured to determine a planned path of each robot in a robot fleet, where the planned path of each robot is used to indicate a movement path for the robot to move to a corresponding target storage location within a shelving unit region to execute a task;

a following road segment determining module, configured to determine a following road segment in the planned path of each following robot, where the following road segment includes a road segment located on the ground and/or a road segment extending in a vertical direction; and a sending module, configured to send the following road segment to a corresponding following robot, so that each following robot enters a following mode at a start point of the following road segment and follows a front cart to arrive at an aisle corresponding to the target storage location, and/or ends the following mode at an end point of the following road segment and arrives at the target storage location to execute a goods retrieval or storage task.

Optionally, the sending module is further configured to send a grouping signal to a plurality of robots, so that the robots arrive at a grouping location based on the grouping signal, where the grouping signal includes grouping time information and grouping location information.

The apparatus further includes:

a receiving module, configured to receive arrival moment information sent by the robots;

a location determining module, configured to determine a place of a corresponding robot in the fleet based on the arrival moment information sent by the robots; and a role determining module, configured to determine a role of each robot in the fleet based on the place of each robot in the fleet, and send role identification information to each robot.

Optionally, the sending module is further configured to send a grouping signal to a plurality of robots, where the grouping signal includes grouping time information and grouping location information.

The apparatus further includes:

a receiving module, configured to receive serial numbers of the current carts and corresponding role identification information sent by the robots, where the serial numbers of the current carts and the corresponding role identification information are sent by the robots after arriving at the grouping location based on the grouping signal, detecting whether another robot exists at the grouping location, and determining roles of the current carts; and a role determining module, configured to a role and a position sequence of each robot in the fleet based on the role identification information of each robot.

According to a ninth aspect, this application provides an electronic device, including: a memory, configured to store program instructions; a processor, configured to invoke and execute the program instructions in the memory to perform the method in the first aspect, the second aspect, the third aspect, or the fourth aspect.

In a tenth aspect, this application provides a computer-readable storage medium storing a computer program. When the computer program is executed by a processor, the method in the first aspect, the second aspect, the third aspect, or the fourth aspect is implemented.

In an eleventh aspect, this application provides a program product. When the computer program is executed by a processor, the method in the first aspect, the second aspect, the third aspect, or the fourth aspect is implemented.

This application provides the fleet control method and apparatus, the electronic device, and the storage medium. The fleet control method is used for controlling the robot fleet, the robot fleet includes the leader robot and at least one following robot, the method is applicable to the leader robot, and the method includes: determining a planned path of each robot in the robot fleet, where the planned path of each robot is used to indicate a movement path for the robot to move to a corresponding target storage location within a shelving unit region to execute a task; determining a following road segment in the planned path of each following robot based on the planned path of each robot, where the following road segment includes a road segment located on the ground and/or a road segment extending in a vertical direction; and sending the following road segment to a corresponding following robot, so that each following robot enters a following mode at a start point of the following road segment and follows a front cart to arrive at an aisle corresponding to the target storage location, and/or ends the following mode at an end point of the following road segment and arrives at the target storage location to execute a goods retrieval or storage task. In the solution of this application, the robot fleet is established, the robots within the fleet are uniformly managed and controlled, some management permissions are granted to the leader robot, and the leader robot determines the following road segment for each following robot based on the planned path of each robot, and sends information about the following road segment to the corresponding following robot, so that the following robot may enter the following mode and follow the front cart in the following road segment. In this way, the control operations of the warehousing system are reduced and calculation pressure is relieved.

BRIEF DESCRIPTION OF THE DRAWINGS

To describe the technical solutions of this application or the related art more clearly, the drawings required for describing the embodiments or the related art are briefly described below. Apparently, the drawings in the following description show some of the embodiments of this application, and a person of ordinary skill in the art may derive other drawings from these drawings without creative efforts.

FIG. 1 is a schematic diagram of an application scenario according to this application.

FIG. 2 is a flowchart of a fleet control method according to an embodiment of this application.

FIG. 4 is a schematic diagram of another fleet control method according to an embodiment of this application.

FIG. 5 is a schematic diagram of a fleet control method according to an embodiment of this application.

FIG. 6 is a schematic diagram of another fleet control method according to an embodiment of this application.

DETAILED DESCRIPTION

Figure 3A:
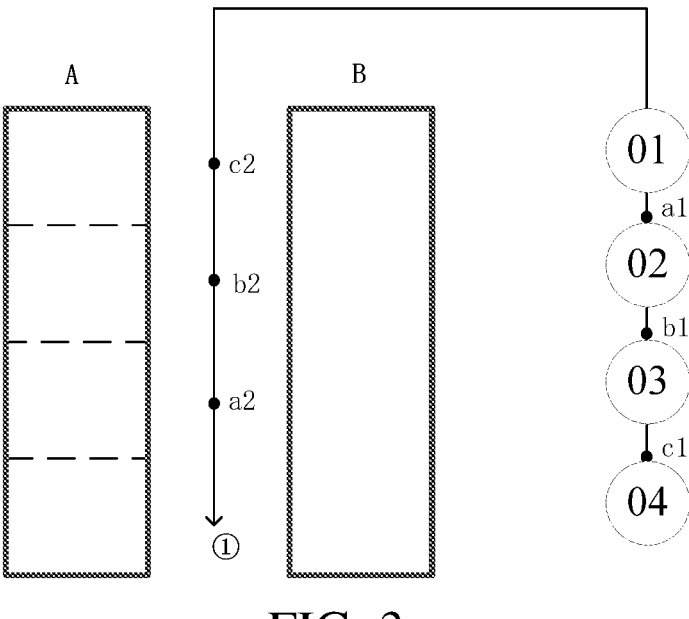
FIG. 3a is a top view of a warehouse in a scenario according to an embodiment of this application.

In order to make the objectives, technical solutions, and advantages of this application clearer, the technical solutions in this application are clearly and completely described below with reference to the drawings in this application. Apparently, the described embodiments are merely some rather than all of the embodiments of this application. All other embodiments obtained by a person of ordinary skill in the art based on the embodiments of this application without making creative efforts shall fall within the protection scope of this application.

As warehousing scales become larger, warehouse floor areas become larger, shelving units increase, and warehousing robots increase. Generally, each robot is managed and controlled separately by a warehousing management system. As robots increase, system management requires an enormous calculation capability, resulting in excessive pressure in the system.

Therefore, this application provides a fleet control method and apparatus, an electronic device, and a storage medium. Through the method, robots may be formed into a fleet and managed and controlled uniformly in the form of the fleet, which reduces calculation pressure of a system. Some management permissions even may be granted to a leader robot in the fleet, which further reduces the calculation pressure of the system.

FIG. 1 is a schematic diagram of an application scenario according to this application. As shown in FIG. 1, the application scenario includes a terminal device 10, a plurality of workstations 20, a plurality of robots 30, a warehouse 40, and a shelving unit 50 in the warehouse storing a plurality of pieces of goods.

The terminal device 10 may be any type of electronic computing platform or device and serve as a control core of an entire warehouse system. The terminal device may have a corresponding storage space or computing capability depending on actual requirements, to provide one or more application services or functions, such as receiving orders, assigning orders, delivering orders, and or controlling a robot to perform a goods retrieval/storage task, etc.

The workstation 20 is an integrated device for goods delivery. One or more different types of operating mechanisms and functional modules are arranged depending on an actual delivery process or design requirements, such as a put wall used for temporary storage of goods, a robotic arm for sorting of goods, etc. A quantity of the workstations may depend on one or more factors such as a floor area, construction costs, a goods flow, and delivery efficiency of a warehouse. For example, three or more workstations may be arranged.

The robot 30 is an automated device that is provided with a walking mechanism and that can move between the workstation 20 and the warehouse 40 and transport a goods box for goods retrieval/storage. The walking mechanism may adopt any suitable type of power system. The robot 30 can load at least one goods box once.

The warehouse 40 is a region for storing goods boxes. For ease of management, a plurality of shelving units 50 may be arranged in the warehouse 40. Each of the shelving units 50 may include a plurality of layers, each of the layers has a plurality of storage locations, each of the storage locations may be used to place goods boxes, and at least one type of goods may be stored in each of the goods boxes. The goods box is a container that carries goods, which may be a tray, a box body, or the like.

The warehousing system may assign a task to the robot 30 based on an order status. The robot 30 may carry a goods box at a designated storage location in the shelving unit 50 to another location in the workstation 20 or the warehouse 40 according to the task, or may carry a goods box at the another location in the workstation 20 or the warehouse 40 to the designated storage location in the shelving unit 50. During goods carrying in this scenario, a fleet control method provided in the embodiments of this disclosure may be applied. The plurality of robots are formed into a fleet, and then uniform task assignment, management, and control are performed on the plurality of robots 30 within a same fleet.

FIG. 2 is a flowchart of a fleet control method according to an embodiment of this application. The method in this embodiment is used for controlling a robot fleet, and the robot fleet includes a leader robot and at least one following robot. The method is applicable to the leader robot. As shown in FIG. 2, the method in this embodiment may include the following steps:

S201: Determine a planned path of each robot in the robot fleet.

The planned path of each robot is used to indicate a movement path for the robot to move to a corresponding target storage location within a shelving unit region to execute a task.

In this application, the task is a goods retrieval and/or storage task. The target storage location is a storage location corresponding to a goods box to be retrieved and/or stored.

The planned path of each robot in the fleet may be planned by a server based on a task assigned to each robot, and then the planned paths are uniformly sent to the leader robot. The leader robot sends the planned path of each following robot to a corresponding following robot.

Alternatively, the server may plan the planned path based on the task assigned to each robot, and then uniformly send the planned paths to the leader robot and send the planned path of each following robot to the corresponding following robot.

Alternatively, the server may send information about to-be-assigned tasks to the leader robot, and the leader robot assigns the to-be-assigned tasks, plans the planned path for each robot in the fleet based on a task assignment status, and sends the planned path of each following robot to the corresponding following robot.

Alternatively, the server may send a task assignment status to the leader robot, and the leader robot plans the planned path for each robot in the fleet combined based on the task assignment status, and sends the planned path of each following robot to the corresponding following robot.

The leader robot may determine the planned path of each robot in the robot fleet in any of the above assignment manners.

S202: Determine a following road segment in the planned path of each following robot based on the planned path of each robot.

The following road segment includes a road segment located on the ground and/or a road segment extending in a vertical direction.

The robots in the fleet are arranged according to specific position sequences, and the planned path of each following cart may have a partial path the same as that of the planned path of the front cart. The partial path may be referred to as the following road segment. The following cart may follow the front cart on the following road segment, so that the server or the leader cart does not need to manage and control the following cart separately.

Depending on the different planned path of each following cart and the different planned path of the front cart thereof, the following road segment may include the segment located on the ground, or may include both the road segment located on the ground and the road segment extending in a vertical direction. In this application, extending in the vertical direction means extending in a vertical upward or downward direction perpendicular to the ground. That is to say, in this application, the robot may not only walk on the ground, but also walk vertically on the shelving unit to climb to the target storage location.

In this application, "front cart" is used to indicate an adjacent front cart of a robot in a traveling direction, and "rear cart" is used to indicate a rear adjacent robot of the robot in the traveling direction.

S203: Send the following road segment to a corresponding following robot, so that each following robot enters a following mode at a start point of the following road segment and follows a front cart to arrive at an aisle corresponding to the target storage location, and/or ends the following mode at an end point of the following road segment and arrives at the target storage location to execute a goods retrieval or storage task.

The leader robot sends a determined following road segment in the planned path of each following robot to the corresponding following robot. Correspondingly, each following robot receives the corresponding following road segment.

It may be understood that the following road segment has the start point and the end point. During the advancement, the following robot may enter the following mode when detecting that the following robot arrives at the start point of the following road segment, follow the front cart, and end the following mode when arriving at the end point of the following road segment.

In a scenario of moving toward the shelving unit in the warehouse for goods retrieval/storage, the following robot may arrive at the aisle corresponding to the target storage location through the following. As shown in FIG. 1, a passage between two shelving units 50 is the aisle. A location where the planned path finally arrives is the target storage location.

In some embodiments, all robots in the fleet may gather at a grouping location and then start to move toward the shelving unit region in the warehouse. In this scenario, the start point of the following road segment is the grouping location.

The fleet control method in this embodiment is used for controlling the robot fleet and the robot fleet includes the leader robot and at least one following robot. The method is applicable to the leader robot, and the method includes: determining a planned path of each robot in the robot fleet, where the planned path of each robot is used to indicate a movement path for the robot to move to a corresponding target storage location within a shelving unit region to execute a task; determining a following road segment in the planned path of each following robot based on the planned path of each robot, where the following road segment includes a road segment located on the ground and/or a road segment extending in a vertical direction; and sending the following road segment to a corresponding following robot, so that each following robot enters a following mode at a start point of the following road segment and follows a front cart to arrive at an aisle corresponding to the target storage location, and/or ends the following mode at an end point of the following road segment and arrives at the target storage location to execute a goods retrieval or storage task. In the solution of this application, the robot fleet is established, the robots within the fleet are uniformly managed and controlled, some management permissions are granted to the leader robot, and the leader robot determines the following road segment for each following robot based on the planned path of each robot, and sends information about the following road segment to the corresponding following robot, so that the following robot may enter the following mode and follow the front cart in the following road segment. In this way, the control operations of the warehousing system are reduced and calculation pressure is relieved.

In some embodiments, each shelving unit is provided with a plurality of vertical tracks for the robot to climb, a plurality of layers of storage locations are arranged corresponding to each of the vertical tracks, and the target storage locations corresponding to the robots in the robot fleet are in the same aisle. The determining a planned path of each robot in the robot fleet includes: receiving to-be-executed tasks of the robot fleet sent by a server, where a number of the tasks matches a number of the robots in the robot fleet; assigning a task to each robot based on a depth of the vertical track where the target storage location corresponding to each of the to-be-executed tasks is located, a height of the target storage location, and a position sequence of each robot in the robot fleet, where the depth corresponding to the vertical track is a distance between the vertical track and an aisle entrance; and determine the planned path of each robot based on the depth of the vertical track corresponding to the task assigned to the robot and the height of the target storage location.

In order to further simplify the fleet control process, tasks in the same aisle may be assigned to the robots in the fleet during task assignment. In this way, the robots in the fleet are about to arrive at the same aisle, so that a path planning process can be simpler, and a proportion of following road segments is larger. Specifically, corresponding to the manner "the server sends the information about to-be-assigned tasks to the leader robot, and the leader robot assigns the to-be-assigned tasks, plans the planned path for each robot in the fleet based on the task assignment status, and sends the planned path of each following robot to the corresponding following robot" described in the embodiment of FIG. 2, in this embodiment, the server sends the to-be-executed tasks to the leader robot in the robot fleet, and the leader robot assigns the tasks to the robots in the fleet (including the leader robot and other following robots) based on the target storage locations corresponding to the tasks, and then performs path planning for each robot, based on the target storage locations, to determine the planned path of each robot.

The formation of the robot fleet may be controlled by the server as required. For example, goods boxes at ten target storage locations in the same aisle are to be taken out, and each robot carries one goods box. In this case, the server may search for ten idle robots to form a fleet, determine one of the robots as a leader robot, and send ten to-be-executed tasks to the leader robot. In this way, it is ensured that a number of the robots in the fleet matches a number of the to-be-executed tasks. It should be noted that "the number of the robots in the fleet matches the number of the to-be-executed tasks" does not mean that the number of the robots in the fleet is "equal" to the number of the to-be-executed tasks, but instead a number of goods boxes each robot in the fleet can carry is greater than or equal to a goods box number corresponding to the to-be-executed task. For example, a robot can carry up to four goods boxes. In this case, the robot may be arranged to carry one to four goods boxes according to an actual status.

In some other embodiments, each shelving unit is provided with a plurality of vertical tracks for the robot to climb, a plurality of layers of storage locations are arranged corresponding to each of the vertical tracks, and the target storage locations corresponding to the robots in the robot fleet are in the same aisle. The method further includes: receiving to-be-executed tasks of the leader robot sent by a server, where the task is sent by the server after assigning the task to each robot based on a depth of the vertical track where the target storage location corresponding to each of the to-be-executed tasks of the robot fleet is located, a height of the target storage location, and a position sequence of each robot in the robot fleet, and the depth corresponding to the vertical track is a distance between the vertical track and an aisle entrance; and The determining a planned path of each robot in the robot fleet includes: receiving the planned path of each robot sent by the server, where the planned path is determined by the server based on the depth of the vertical track corresponding to the task assigned to the robot and the height of the target storage location.

Specifically, corresponding to the manner "the server plans the planned path based on the task assigned to each robot, and then uniformly sends the planned paths to the leader robot" described in the embodiment of FIG. 2, in this embodiment, the server assigns the task to each robot based on the target storage locations corresponding to the to-be-executed tasks and the position sequence of each robot in the fleet, performs path planning for each robot based on an assignment result, determines the planned path of each robot, and then uniformly sends the planned paths to the leader robot.

Task assignment is still performed by the server, but management and control of the advancement process of the following cart are reduced on the server side. Correspondingly, task assignment and path planning do not need to be performed on the robot side. Therefore, power consumption of the robot is low, functional requirements are low, and costs can be effectively controlled.

The assignment of the task to the robot based on the depth of the vertical track where the target storage location corresponding to each of the to-be-executed tasks is located, the height of the target storage location, and the position sequence of each robot in the robot fleet described in the above two embodiments may specifically include: dividing the robot fleet into a plurality of sub-fleets based on the depths of the vertical tracks where the target storage locations corresponding to the to-be-executed tasks are located; assigning the to-be-executed tasks corresponding to the same vertical track to one of the sub-fleets; and assigning, for the sub-fleets, the to-be-executed tasks with the corresponding target storage locations in descending order of heights to the robots located from front to rear within the sub-fleet.

The depth of the vertical track is a depth of the vertical track to the aisle entrance.

Figure 3B:
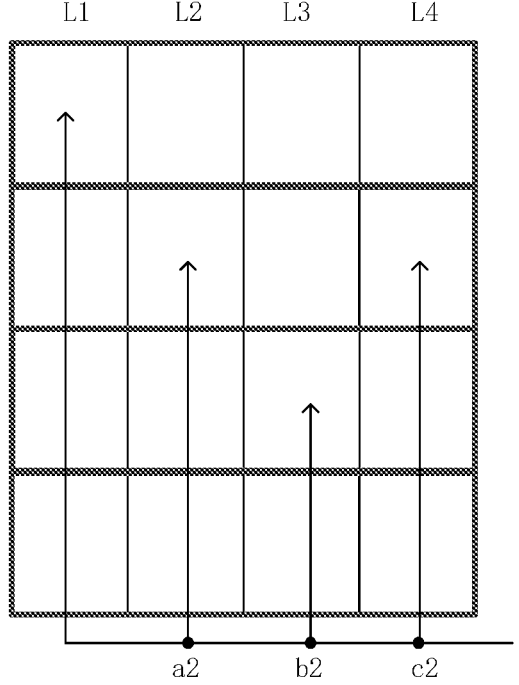
FIG. 3b is a side view of a shelving unit in a scenario according to an embodiment of this application.

FIG. 3a is a schematic diagram of a scenario corresponding to the above two embodiments, which is a top view of a warehouse. An aisle ① exists between a shelving unit A and a shelving unit B. FIG. 3b is a side view of the shelving unit A viewed from the shelving unit B. The shelving unit A has four vertical tracks, and each of the vertical tracks corresponds to four storage locations. Four tasks are to be executed, and respectively correspond to a first storage location on a vertical track L1, a second storage location on a vertical track L2, a third storage location on a vertical track L3, and a second storage location on a vertical track L4 of the shelving unit A. The server selects four robots to establish a fleet, and the four robots are named as 01, 02, 03, 04 based on the position sequences thereof in the fleet. Dashed lines in the figure indicate a specified advancement route in the warehouse. According to the specified advancement route in the warehouse, it may be determined that an entrance of ① is an upper end of ① in the figure. It may be learned that the vertical track L1 has a largest depth, followed by L2, L3, and L4. Therefore, a task corresponding to the first storage location on L1 may be assigned to the robot 01, a task corresponding to the second storage location on the vertical track L2 may be assigned to the robot 02, a task corresponding to the third storage location on the vertical track L3 may be assigned to the robot 03, and a task corresponding to the second storage location on the vertical track L4 may be assigned to the robot 04.

Correspondingly, the above determination of the planned path of each robot based on the depth of the vertical track corresponding to the task assigned to the robot and the height of the target storage location includes: planning first paths for the robots in each sub-fleet to arrive at the vertical tracks based on the depths of the vertical tracks where the target storage locations corresponding to the to-be-executed tasks are located; and planning, for each sub-fleet, second paths for the robots to arrive at the target storage locations based on the heights of the target storage locations corresponding to the to-be-executed tasks.

The path planning, the planning may be divided into two stages. A first stage is arriving at the aisle entrance. Since the tasks of the entire fleet correspond to the same aisle, each robot in the fleet needs to arrive at an entrance of the same aisle. Therefore, the first paths in the first stage may be uniformly planned for the entire fleet. A second stage is movement from the aisle entrance to the storage location. Since the robots in the fleet correspond to different storage locations, the second paths in the second stage need to be planned separately for different robots.

It may be seen herein that in this scenario, the first paths are actually a road segment through which the whole fleet passes, that is, the first paths are the following road segment. In a subsequent process of determining the following road segment, the second paths may be directly analyzed, and combined with the first paths.

Still referring to FIG. 3a and FIG. 3b, a solid line segment is an example of the planned path. A start point of the planned path is a current location of each robot, which is the grouping location of the fleet. A region may be arranged in the warehouse as a default grouping location of the fleet.

In may be learned from the planned paths in FIG. 3a and FIG. 3b that the following road segment of the robot 02 is a1a2, the following road segment of the robot 03 is b1b2, and the following road segment of the robot 04 is c1c2.

The robot needs to maintain a synchronous traveling state through mechanical connection or communication to the front/rear cart, to ensure following on the following road segment.

Specifically, in some embodiments, the above method further includes: sending traveling state information of a current cart to a rear cart in real time within the following road segment, so that the rear cart adjusts a steering angle based on the traveling state information of the leader robot after a preset time interval, to follow the leader robot.

The robot in the fleet may share the traveling state information with the rear cart in real time. The leader robot may send the traveling state information of the current cart, such as a speed, an acceleration, and a steering angle to the rear cart in real time. The rear cart needs to maintain a consistent speed and acceleration with the leader robot, and needs to adjust the steering angle after the preset interval time. The same is true for other robots in the fleet. The robots in the fleet need to maintain a specific safe distance from each other. When the rear cart maintains the same speed as the leader robot, the rear cart can arrive at the current location of the leader robot only after the preset interval time.

In some other embodiments, the above method further includes: sharing traveling state information of the leader robot in real time within the following road segment through a self-organized fleet network, so that the following robots in the fleet adjust a steering angle based on the traveling state information of the leader robot after a time of (N−1) T, to follow the front carts, where N is an order-position of each robot in the fleet, and T is a preset time interval.

The leader robot in the fleet may share the traveling state information with all following robots in real time through the self-organized fleet network. An order-position of the leader robot in the fleet is set as 1. In this case, an order-position of the following robot of the leader robot in the fleet is 2, and order-positions of other following robots increase progressively. The same as the above embodiments, each robot cart needs to maintain a consistent speed and acceleration with the leader robot. However, when the following robot maintains the same speed as the leader robot, the following robot can arrive at the current location of the leader robot only after N−1 preset time intervals. Therefore, the steering angle needs to be updated after a time of (N−1) T.

In some embodiments, the grouping process described in the above embodiments may include: receiving a grouping signal sent by the server, where the grouping signal includes grouping time information and grouping location information; arriving at a grouping location based on the grouping signal; sending arrival moment information to the server, so that the server determines the position sequence of each robot in the fleet based on the arrival moment information and the arrival moment information of other robots in the fleet, determines a role of each robot in the fleet based on the position sequence of the robots in the fleet, and sends role identification information to each robot; receiving the role identification information sent by the server; and determining that a current cart is the leader robot after the role identification information corresponding to the leader robot is received.

The server sends the grouping signal as required. Working status of all robots in the warehouse may be queried, to select a required number of robots, and the grouping signal is sent to these robots, to prompt these robots to arrive at the grouping location for grouping before the grouping time. Alternatively, the server may directly send the grouping signal to all robots, and each robot determines whether to go to the grouping location based on the current working status thereof. Once a target number of robots arrive at the grouping location, the grouping is completed.

The robots may send arrival signals to the server to report serial numbers and arrival moments of the robots after arriving at the grouping location. The server determines the position sequence of each robot in the fleet based on the arrival moment of each robot in the fleet, and then determines a role of each robot in the fleet. A robot that arrives first and is ranked first in the fleet is the leader robot, and other robots are following robots. The server may alternatively send the corresponding role identification information of each robot to the corresponding robot. The role identification information not only includes the role information (a leader robot or a following robot), but also includes the location number of the robot in the fleet. The robot may determine the location and the role of the robot in the fleet after receiving the role identification information. In this way, the robots may further establish targeted connection with each other for communication in a subsequent communication process.

In other embodiments, the grouping process described in the above embodiment may further includes: receiving a grouping signal sent by the server, where the grouping signal includes grouping time information and grouping location information; arriving at a grouping location based on the grouping signal; detecting whether another robot exists at the grouping location; determining that a current cart is the leader robot if no another robot exists at the grouping location; and sending a serial number of the current cart and the role identification information corresponding to the leader robot to the server, so that the server determines a role and a position sequence of each robot in the fleet based on the role identification information of the current cart and the role identification information sent by another robot belonging to the same robot fleet as the current cart.

In this implementation, the robot determines the role of the robot by itself. For example, after a robot arrives at the grouping location, the robot may determine whether another robot exists at the grouping location through an image detection device. If no another robot exists at the grouping location, it indicates that the robot is the first robot arriving at the grouping location and ranks first in the fleet, that is, the robot is a leader robot. If another robot exists at the grouping location, the robot is a following robot. After the robot preliminarily determines the role of the robot in the fleet, the robot may report the serial number of the robot and the role information to the server. The server may further determine a specific position sequence of each following robot in the fleet based on an order of receiving the reported information.

FIG. 4 is a flowchart of a fleet control method according to an embodiment of this application. The method in this embodiment is used for controlling a robot fleet, and the robot fleet includes a leader robot and at least one following robot. The method is applicable to the following robot. As shown in FIG. 4, the method in this embodiment may include the following steps:

S401: Receive a planned path sent by the leader robot.

The planned path is sent by the leader robot after determining the planned path of each robot in the robot fleet and determining a following road segment in the planning path of each following robot based on the planned path of each robot, the planned path of each robot is used to indicate a movement path for the robot to move to a corresponding target storage location within a shelving unit region to execute a task, and the following road segment includes a road segment located on the ground and/or a road segment extending in a vertical direction.

S402: Enter a following mode at a start point of the following road segment and follow a front cart to arrive at an aisle corresponding to the target storage location, and/or end the following mode at an end point of the following road segment and arrive at the target storage location to execute a goods retrieval or storage task.

The fleet control method in this embodiment has the same features as the method in the corresponding embodiment of FIG. 2 or has corresponding features, and may achieve the same technical effects. An implementation of the method is not described in detail herein.

As mentioned above, the robot may maintain the synchronous traveling state through mechanical connection to the front/rear cart on the following road segment. Specifically, the following robot may extend a connecting mechanism forward at the start point of the following road segment to connect to the front cart, and follow the front cart to arrive at the aisle corresponding to the target storage location; and/or cut off the connection from the front cart at the end point of the following road segment, retract the connecting mechanism, and arrive at the target storage location to execute the goods retrieval or storage task.

In this implementation, a corresponding telescopic connecting structure needs to be arranged on the robot, so that the robot may be connected with other robots front and back.

As mentioned above, the robot may also maintain the synchronous driving state through communication on the following road segment.

In some embodiments, the above method may further include: receiving traveling state information sent by the front cart in real time within the following road segment; updating a relevant parameter of a current cart based on the traveling state information of the front cart after a preset time interval to follow the front cart; and/or sending traveling state information of the current cart to a rear cart in real time, so that the rear cart updates the relevant parameter of the current cart based on the traveling state information after the preset time interval to follow the front cart.

Corresponding to the manner of synchronizing the traveling state of the leader robot, the robot in the fleet may share the traveling state information with the rear cart in real time. The following robots may not only receive the traveling state information sent by the front carts, but also synchronize the traveling state information of the robot with the rear carts, except for the last following robot in the fleet, it merely needs to receive the traveling state information sent by the front cart.

In other embodiments, the entering a following mode at a start point of the following road segment and following a front cart to arrive at an aisle corresponding to the target storage location includes: detecting a distance to the front cart through a sensor in real time from the start point of the following road segment; and adjusting a movement state of a current cart in real time based on a detected distance to the front cart and a preset distance range, to maintain the distance to the front cart within the preset distance range, and following the front cart to arrive at the aisle corresponding to the target storage location.

In this implementation, a corresponding distance sensor needs to be arranged on the robot to detect the distance to the front cart in real time, so as to dynamically adjust movement state parameters of the current cart such as a speed and a direction based on a change in the distance.

In some other implementations, the distance sensor may be arranged separately on a front and a rear of the robot to adjust the distances to the front cart and the rear cart simultaneously.

Optionally, the method further includes: receiving a grouping signal sent by the server, where the grouping signal includes grouping time information and grouping location information; arriving at a grouping location based on the grouping signal; sending arrival moment information to the server, so that the server determines the position sequence of each robot in the fleet based on the arrival moment information and the arrival moment information of other robots in the fleet, determines a role of each robot in the fleet based on the position sequence of the robots in the fleet, and sends role identification information to each robot; receiving the role identification information sent by the server; and determining that the current cart is the following robot after the role identification information corresponding to the following robot is received.

Optionally, the method further includes: receiving a grouping signal sent by the server, where the grouping signal includes grouping time information and grouping location information; arriving at a grouping location based on the grouping signal;

detecting whether another robot exists at the grouping location; determining that the current cart is the following robot if another robot exists at the grouping location; and sending a serial number of the current cart and the role identification information corresponding to the following robot to the server, so that the server determines a role and a position sequence of each robot in the fleet based on the role identification information sent by each robot.

The above two grouping processes correspond to the feature of the leader robot side. For details, refer to the description in the above embodiments, and the details are not described.

During actual application, two types of robots may be designed: one is designed to perform the method applicable to the leader robot, which merely serves as the leader robot, and the other is designed to perform the method applicable to the following robot method, which merely serves as the following robot. Alternatively, one type of robot may be designed, which may serve as either the leader robot or the following robot. A specific method to be executed depends on the role identification information, and the manner of determining the role identification information is correspondingly described in the above embodiments. Reference may be made thereto.

FIG. 5 is a flowchart of a fleet control method according to an embodiment of this application. The method in this embodiment is used for controlling a robot fleet, and the robot fleet includes a leader robot and at least one following robot. The method is applicable to a server, and the method includes the following steps:

S501: Determine a planned path of each robot in the robot fleet.

The planned path of each robot is used to indicate a movement path for the robot to move to a corresponding target storage location within a shelving unit region to execute a task.

S502: Send the planned path of each robot to the leader robot, so that the leader robot determines a following road segment in the planned path of each following robot, and sends the following road segment to a corresponding following robot, so that each following robot enters a following mode at a start point of the following road segment and follows a front cart to arrive at an aisle corresponding to the target storage location, and/or ends the following mode at an end point of the following road segment and arrives at the target storage location to execute a goods retrieval or storage task.

The following road segment includes a road segment located on the ground and/or a road segment extending in a vertical direction.

Optionally, the method further includes:

sending a grouping signal to a plurality of robots, so that the robots arrive at a grouping location based on the grouping signal, where the grouping signal includes grouping time information and grouping location information;

receiving arrival moment information sent by the robots;

determining a place of a corresponding robot in the fleet based on the arrival moment information sent by the robots; and determining a role of each robot in the fleet based on the position sequence of each robot in the fleet, and sending role identification information to each robot.

Optionally, the method further includes:

sending a grouping signal to a plurality of robots, where the grouping signal includes grouping time information and grouping location information.

receiving serial numbers of the current carts and corresponding role identification information sent by the robots, where the serial numbers of the current carts and the corresponding role identification information are sent by the robots after arriving at the grouping location based on the grouping signal, detecting whether another robot exists at the grouping location, and determining roles of the current carts; and determining a role and a position sequence of each robot in the fleet based on the role identification information of each robot.

The method performed by the server in this embodiment corresponds to the above methods for the leader robot and the following robot and has the same technical effect. The details are not described herein.

FIG. 6 is a flowchart of a fleet control method according to an embodiment of this application. The method in this embodiment is used for controlling a robot fleet, and the robot fleet includes a leader robot and at least one following robot. The method is applicable to a server, and the method includes the following steps:

S601: Determine a planned path of each robot in the robot fleet.

The planned path of each robot is used to indicate a movement path for the robot to move to a corresponding target storage location within a shelving unit region to execute a task.

S602: Determine a following road segment in the planned path of each following robot.

The following road segment includes a road segment located on the ground and/or a road segment extending in a vertical direction.

S603: Send the following road segment to a corresponding following robot, so that each following robot enters a following mode at a start point of the following road segment and follows a front cart to arrive at an aisle corresponding to the target storage location, and/or ends the following mode at an end point of the following road segment and arrives at the target storage location to execute a goods retrieval or storage task.

Optionally, the method further includes:

sending a grouping signal to a plurality of robots, so that the robots arrive at a grouping location based on the grouping signal, where the grouping signal includes grouping time information and grouping location information.

receiving arrival moment information sent by the robots;

determining a position sequence of a corresponding robot in the fleet based on the arrival moment information sent by the robots; and determining a role of each robot in the fleet based on the position sequence of each robot in the fleet, and sending role identification information to each robot.

Optionally, the method further includes:

sending a grouping signal to a plurality of robots, where the grouping signal includes grouping time information and grouping location information.

receiving serial numbers of the current carts and corresponding role identification information sent by the robots, where the serial numbers of the current carts and the corresponding role identification information are sent by the robots after arriving at the grouping location based on the grouping signal, detecting whether another robot exists at the grouping location, and determining roles of the current carts; and determining a role and a position sequence of each robot in the fleet based on the role identification information of each robot.

Optionally, during the determination of the following road segment in the planned path of each following robot, specifically, first paths for the robots in each sub-fleet to arrive at the vertical tracks may be planned based on the depths of the vertical tracks where the target storage locations corresponding to the to-be-executed tasks are located; and second paths for the robots to arrive at the target storage locations may be planned for each sub-fleet based on the heights of the target storage locations corresponding to the to-be-executed tasks.

The method performed by the server in this embodiment corresponds to the above methods for the leader robot and the following robot and has the same technical effect. The details are not described herein.

However, in this embodiment, the following road segment is determined by the server. Correspondingly, the robot side merely needs to perform the following method.

Figure 7:
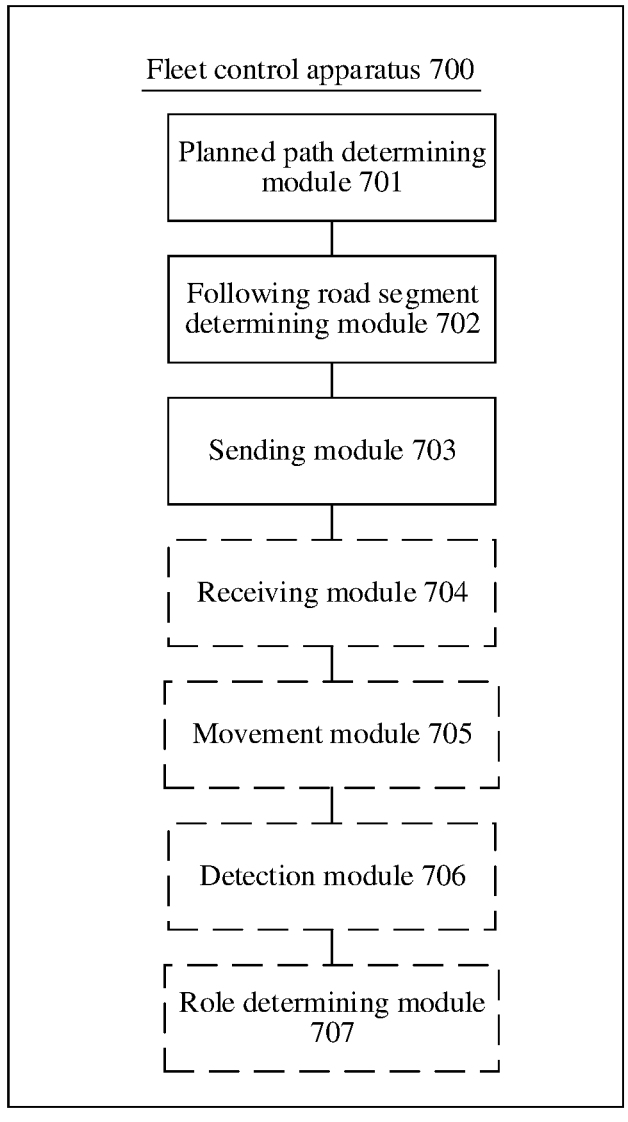
FIG. 7 is a schematic structural diagram of a fleet control apparatus according to an embodiment of this application.

FIG. 7 is a schematic structural diagram of a fleet control apparatus according to an embodiment of this application. As shown in FIG. 7, a fleet control apparatus 700 in this embodiment includes a planned path determining module 701, a following road segment determining module 702, and a sending module 703.

The planned path determining module 701 is configured to determine a planned path of each robot in a robot fleet, where the planned path of each robot is used to indicate a movement path for the robot to move to a corresponding target storage location within a shelving unit region to execute a task.

The following road segment determining module 702 is configured to determine a following road segment in the planned path of each following robot based on the planned path of each robot, where the following road segment includes a road segment located on the ground and/or a road segment extending in a vertical direction.

The sending module 703 is configured to send the following road segment to a corresponding following robot, so that each following robot enters a following mode at a start point of the following road segment and follows a front cart to arrive at an aisle corresponding to the target storage location, and/or ends the following mode at an end point of the following road segment and arrives at the target storage location to execute a goods retrieval or storage task.

Optionally, each shelving unit is provided with a plurality of vertical tracks for the robot to climb, a plurality of layers of storage locations are arranged corresponding to each of the vertical tracks, and the target storage locations corresponding to the robots in the robot fleet are in the same aisle.

The planned path determining module 701 is specifically configured to:

receive to-be-executed tasks of the robot fleet sent by a server, where a number of the tasks matches a number of the robots in the robot fleet;

assign a task to each robot based on a depth of the vertical track where the target storage location corresponding to each of the to-be-executed tasks is located, a height of the target storage location, and a position sequence of each robot in the robot fleet, where the depth corresponding to the vertical track is a distance between the vertical track and an aisle entrance; and determine the planned path of each robot based on the depth of the vertical track corresponding to the task assigned to the robot and the height of the target storage location.

Optionally, each shelving unit is provided with a plurality of vertical tracks for the robot to climb, a plurality of layers of storage locations are arranged corresponding to each of the vertical tracks, and the target storage locations corresponding to the robots in the robot fleet are in the same aisle.

The apparatus further includes: a receiving module 704, configured to receive to-be-executed tasks of the leader robot sent by a server, where the task is sent by the server after assigning the task to each robot based on a depth of the vertical track where the target storage location corresponding to each of the to-be-executed tasks of the robot fleet is located, a height of the target storage location, and a position sequence of each robot in the robot fleet, and the depth corresponding to the vertical track is a distance between the vertical track and an aisle entrance.

The planned path determining module 701 is specifically configured to:

receive the planned path of each robot sent by the server, where the planned path is determined by the server based on the depth of the vertical track corresponding to the task assigned to the robot and the height of the target storage location.

Optionally, during the assignment of the task to each robot based on the depth of the vertical track where the target storage location corresponding to each of the to-be-executed tasks is located, the height of the target storage location, and the position sequence of each robot in the robot fleet, the planned path determining module 701 is specifically configured to:

divide the robot fleet into a plurality of sub-fleets based on the depths of the vertical tracks where the target storage locations corresponding to the to-be-executed tasks are located;

assign the to-be-executed tasks corresponding to the same vertical track to one of the sub-fleets; and assign, for the sub-fleets, the to-be-executed tasks with the corresponding target storage locations in descending order of heights to the robots located from front to rear within the sub-fleet.

Optionally, during the determination of the planned path of each robot based on the depth of the vertical track corresponding to the task assigned to the robot and the height of the target storage location, the planned path determining module 701 is specifically configured to:

plan first paths for the robots in each sub-fleet to arrive at the vertical tracks based on the depths of the vertical tracks where the target storage locations corresponding to the to-be-executed tasks are located; and plan, for each sub-fleet, second paths for the robots to arrive at the target storage locations based on the heights of the target storage locations corresponding to the to-be-executed tasks.

Optionally, the sending module 703 is further configured to:

sending traveling state information of a current cart to a rear cart in real time within the following road segment, so that the rear cart adjusts a steering angle based on the traveling state information of the leader robot after a preset time interval, to follow the leader robot.

Optionally, the sending module 703 is further configured to:

share traveling state information of the leader robot in real time within the following road segment through a self-organized fleet network, so that the following robots in the fleet adjust a steering angle based on the traveling state information of the leader robot after a time of $(N-1)$ T, to follow the front carts, where N is an order-position of each robot in the fleet, and T is a preset time interval.

Optionally, the receiving module 704 is further configured to receive a grouping signal sent by the server, where the grouping signal includes grouping time information and grouping location information.

The apparatus further includes:

a movement module 705, configured to arrive at a grouping location based on the grouping signal, where the sending module 703 is further configured to send arrival moment information to the server, so that the server determines the position sequence of each robot in the fleet based on the arrival moment information and the arrival moment information of other robots in the fleet, determines a role of each robot in the fleet based on the position sequence of the robots in the fleet, and sends role identification information to each robot;

the receiving module 704 is further configured to receive the role identification information sent by the server; and a role determining module 707, configured to determine that a current cart is the leader robot after the role identification information corresponding to the leader robot is received.

Optionally, the receiving module 704 is further configured to receive a grouping signal sent by the server, where the grouping signal includes grouping time information and grouping location information.

The apparatus further includes:

a movement module 705, configured to arrive at a grouping location based on the grouping signal;

a detection module 706, configured to detect whether another robot exists at the grouping location; and a role determining module 707, configured to determine that a current cart is the leader robot if no another robot exists at the grouping location.

The sending module 703 is further configured to send a serial number of the current cart and the role identification information corresponding to the leader robot to the server, so that the server determines a role and a position sequence of each robot in the fleet based on the role identification information of the current cart and the role identification information sent by another robot belonging to the same robot fleet as the current cart.

The apparatus in this embodiment may be configured to perform the above method for the leader robot. The implementation principles and technical effects thereof are similar, and the details are not described herein.

Figure 8:
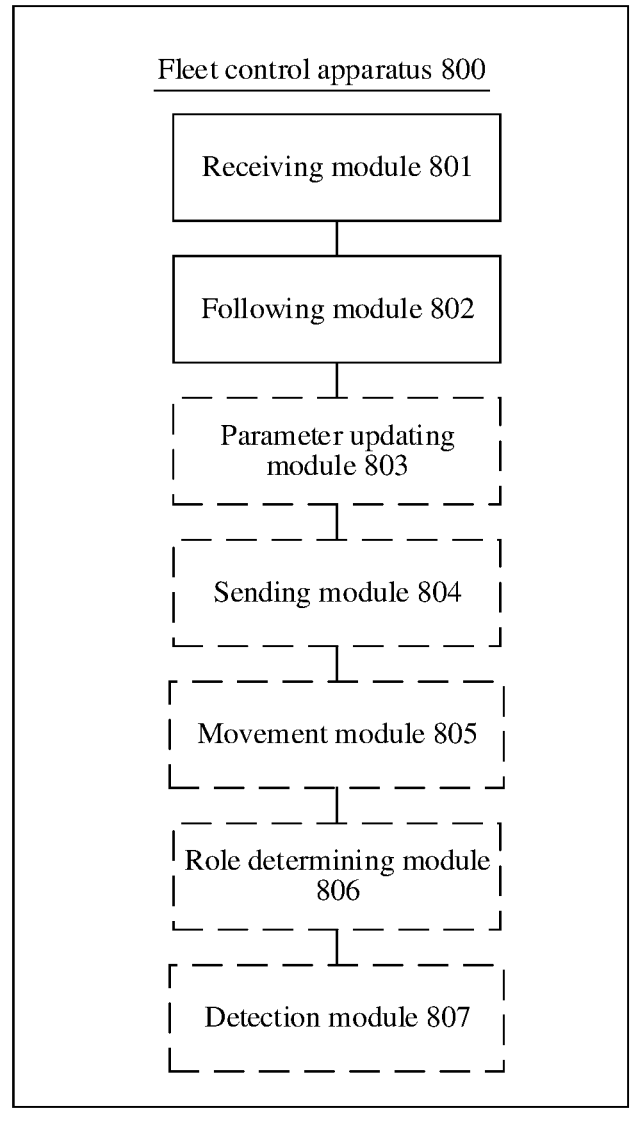
FIG. 8 is a schematic structural diagram of another fleet control apparatus according to an embodiment of this application.

FIG. 8 is a schematic structural diagram of a fleet control apparatus according to an embodiment of this application. As shown in FIG. 8, a fleet control apparatus 800 in this embodiment includes a receiving module 801 and a following module 802.

The receiving module 801 is configured to receive a planned path sent by a leader robot, where the planned path is sent by the leader robot after determining the planned path of each robot in the robot fleet and determining a following road segment in the planning path of each following robot based on the planned path of each robot, the planned path of each robot is used to indicate a movement path for the robot to move to a corresponding target storage location within a shelving unit region to execute a task, and the following road segment includes a road segment located on the ground and/or a road segment extending in a vertical direction; and the following module 802 is configured to enter a following mode at a start point of the following road segment and follow a front cart to arrive at an aisle corresponding to the target storage location, and/or end the following mode at an end point of the following road segment and arriving at the target storage location to execute a goods retrieval or storage task.

Optionally, the receiving module 801 is configured to receive traveling state information sent by the front cart in real time within the following road segment.

The apparatus further includes: a parameter updating module 803, configured to update a relevant parameter of a current cart based on the traveling state information of the front cart after a preset time interval to follow the front cart; and/or the apparatus further includes: a sending module 804, configured to send traveling state information of the current cart to a rear cart in real time, so that the rear cart updates a relevant parameter of the current cart based on the traveling state information of the front cart after the preset time interval to follow the front cart.

Optionally, the following module 802 is specifically configured to:

extend a connecting mechanism forward at the start point of the following road segment to connect to the front cart, and follow the front cart to arrive at the aisle corresponding to the target storage location;

and/or cut off the connection from the front cart at the end point of the following road segment, retract the connecting mechanism, and arrive at the target storage location to execute the goods retrieval or storage task.

Optionally, during the entry of the following mode at the start point of the following road segment and the following with the front cart to arrive at the aisle corresponding to the target storage location, the following module 802 is specifically configured to:

detect a distance to the front cart through a sensor in real time from the start point of the following road segment; and adjust a movement state of a current cart in real time based on a detected distance to the front cart and a preset distance range, to maintain the distance to the front cart within the preset distance range, and follow the front cart to arrive at the aisle corresponding to the target storage location.

Optionally, the receiving module 801 is further configured to receive a grouping signal sent by the server, where the grouping signal includes grouping time information and grouping location information.

The apparatus further includes:

a movement module 805, configured to arrive at a grouping location based on the grouping signal.

The sending module 804 is further configured to send arrival moment information to the server, so that the server determines the position sequence of each robot in the fleet based on the arrival moment information and the arrival moment information of other robots in the fleet, determines a role of each robot in the fleet based on the position sequence of the robots in the fleet, and sends role identification information to each robot.

The receiving module 801 is further configured to receive the role identification information sent by the server.

The apparatus further includes:

a role determining module 806, configured to determine that the current cart is the following robot after the role identification information corresponding to the following robot is received.

Optionally, the receiving module 801 is configured to receive a grouping signal sent by the server, where the grouping signal includes grouping time information and grouping location information.

The apparatus further includes:

a movement module 805, configured to arrive at a grouping location based on the grouping signal;

a detection module 807, configured to detect whether another robot exists at the grouping location; and a role determining module 806, configured to determine that the current cart is the following robot if another robot exists at the grouping location.

The sending module 804 is further configured to send a serial number of the current cart and the role identification information corresponding to the following robot to the server, so that the server determines a role and a position sequence of each robot in the fleet based on the role identification information sent by each robot.

The apparatus in this embodiment may be configured to perform the above method for the following robot. The implementation principles and technical effects thereof are similar, and the details are not described herein.

In some embodiments, a fleet control apparatus having the modules of both of the fleet control apparatuses 700 and 800 may be designed to perform method for the leader robot or the following robot.

Figure 9:
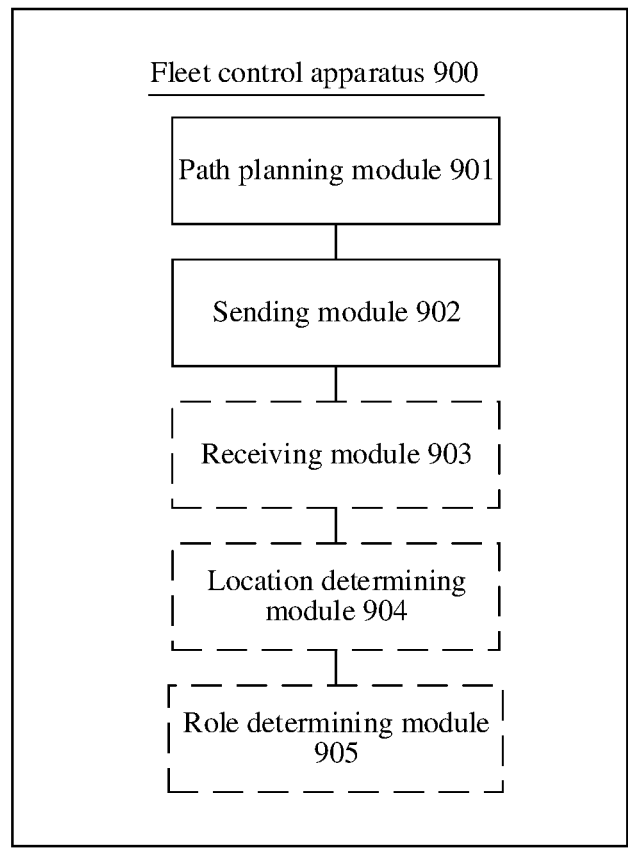
FIG. 9 is a schematic structural diagram of another fleet control apparatus according to an embodiment of this application.

FIG. 9 is a schematic structural diagram of a fleet control apparatus according to an embodiment of this application. As shown in FIG. 9, a fleet control apparatus 900 in this embodiment includes a path planning module 901 and a sending module 902.

The path planning module 901 is configured to determine a planned path of each robot in a robot fleet, where the planned path of each robot is used to indicate a movement path for the robot to move to a corresponding target storage location within a shelving unit region to execute a task.

The sending module 902 is configured to send the planned path of each robot to the leader robot, so that the leader robot determines a following road segment in the planned path of each following robot, and sends the following road segment to a corresponding following robot, so that each following robot enters a following mode at a start point of the following road segment and follows a front cart to arrive at an aisle corresponding to the target storage location, and/or ends the following mode at an end point of the following road segment and arrives at the target storage location to execute a goods retrieval or storage task, where the following road segment includes a road segment located on the ground and/or a road segment extending in a vertical direction.

Optionally, the sending module 902 is further configured to send a grouping signal to a plurality of robots, so that the robots arrive at a grouping location based on the grouping signal, where the grouping signal includes grouping time information and grouping location information.

The apparatus further includes:

a receiving module 903, configured to receive arrival moment information sent by the robots;

a location determining module 904, configured to determine a position sequence of a corresponding robot in the fleet based on the arrival moment information sent by the robots; and a role determining module 905, configured to determine a role of each robot in the fleet based on the position sequence of each robot in the fleet, and send role identification information to each robot.

Optionally, the sending module 902 is further configured to send a grouping signal to a plurality of robots, where the grouping signal includes grouping time information and grouping location information.

The apparatus further includes:

a receiving module 903, configured to receive serial numbers of the current carts and corresponding role identification information sent by the robots, where the serial numbers of the current carts and the corresponding role identification information are sent by the robots after arriving at the grouping location based on the grouping signal, detecting whether another robot exists at the grouping location, and determining roles of the current carts; and a role determining module 905, configured to determine a role and a position sequence of each robot in the fleet based on the role identification information of each robot.

The apparatus in this embodiment may be configured to perform the above method for the server. The implementation principles and technical effects thereof are similar, and the details are not described herein.

Figure 10:
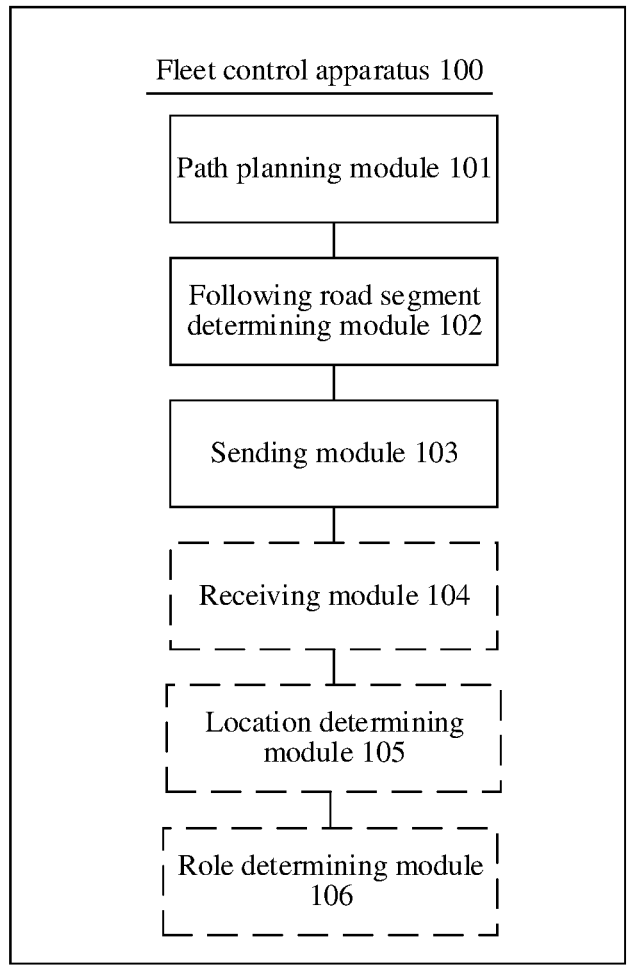
FIG. 10 is a schematic structural diagram of another fleet control apparatus according to an embodiment of this application.

FIG. 10 is a schematic structural diagram of a fleet control apparatus according to an embodiment of this application. As shown in FIG. 10, a fleet control apparatus 100 in this embodiment includes a path planning module 101, a following road segment determining module 102, and a sending module 103.

The path planning module 101 is configured to determine a planned path of each robot in a robot fleet, where the planned path of each robot is used to indicate a movement path for the robot to move to a corresponding target storage location within a shelving unit region to execute a task.

The following road segment determining module 102 is configured to determine a following road segment in the planned path of each following robot, where the following road segment includes a road segment located on the ground and/or a road segment extending in a vertical direction.

The sending module 103 configured to send the following road segment to a corresponding following robot, so that each following robot enters a following mode at a start point of the following road segment and follows a front cart to arrive at an aisle corresponding to the target storage location, and/or ends the following mode at an end point of the following road segment and arrives at the target storage location to execute a goods retrieval or storage task.

Optionally, the sending module 103 is further configured to send a grouping signal to a plurality of robots, so that the robots arrive at a grouping location based on the grouping signal, where the grouping signal includes grouping time information and grouping location information.

The apparatus further includes:

a receiving module 104, configured to receive arrival moment information sent by the robots;

a location determining module 105, configured to determine a position sequence of a corresponding robot in the fleet based on the arrival moment information sent by the robots; and a role determining module 106, configured to determine a role of each robot in the fleet based on the position sequence of each robot in the fleet, and send role identification information to each robot.

Optionally, the sending module 103 is further configured to send a grouping signal to a plurality of robots, where the grouping signal includes grouping time information and grouping location information.

The apparatus further includes:

a receiving module 104, configured to receive serial numbers of the current carts and corresponding role identification information sent by the robots, where the serial numbers of the current carts and the corresponding role identification information are sent by the robots after arriving at the grouping location based on the grouping signal, detecting whether another robot exists at the grouping location, and determining roles of the current carts; and a role determining module 106, configured to determine a role and a position sequence of each robot in the fleet based on the role identification information of each robot.

The apparatus in this embodiment may be configured to perform the above method for the server. The implementation principles and technical effects thereof are similar, and the details are not described herein.

Figure 11:
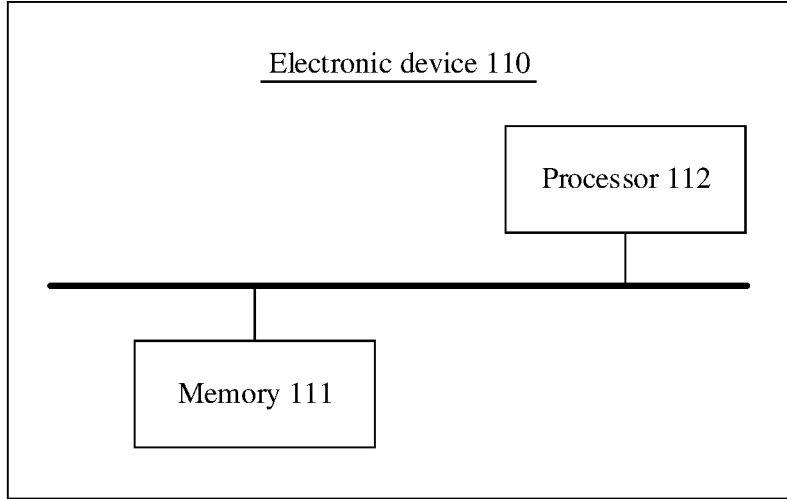
FIG. 11 is a schematic structural diagram of an electronic device according to an embodiment of this application.

FIG. 11 is a schematic structural diagram of an electronic device according to an embodiment of this application. As shown in FIG. 11, an electronic device 110 includes: a memory 111, configured to store a program instruction; and a processor 112, configured to invoke and execute the program instructions in the memory to perform the method in the above embodiments.

This application further provides a computer-readable storage medium storing a computer program. When the computer program is executed by a processor, the method in above embodiments is implemented.

This application further provides a computer product. The computer program is executed by a processor to perform the method in the above embodiments.

A person of ordinary skill in the art may understand that all or some of the steps of the method embodiments may be implemented by instructing relevant hardware through a program. The above program may be stored in a computer-readable storage medium. When the program is executed, steps of the above method embodiments are performed. The above storage medium includes media such as a ROM, a RAM, a magnetic disk, or an optical disk that can store program code.

Finally, it should be noted that: the foregoing embodiments are merely used for describing the technical solutions of this application, but not to limit this application. Although the embodiments of this application are described in detail with reference to the foregoing embodiments, it should be understood by a person of ordinary skill in the art that, modifications may still be made to the technical solutions recorded in the foregoing embodiments, or equivalent replacements may be made to some or all of the technical features; and these modifications or replacements do not cause the essence of corresponding technical solutions to depart from the scope of the technical solutions in the embodiments of this application.

What is claimed is:

1. A fleet control method, wherein the method is used for controlling a robot fleet, the robot fleet comprises a leader robot and at least one following robot, the method is applicable to the leader robot, and the method comprises:
   determining a planned path of each robot in the robot fleet, wherein the planned path of each robot is used to indicate a movement path for the robot to move to a corresponding target storage location within a shelving unit region to execute a task;
   determining a following movement segment in the planned path of each following robot based on the planned path of each robot, wherein the following movement segment comprises a movement segment located on the ground and/or a movement segment extending in a vertical direction; and
   sending the following movement segment to a corresponding following robot, so that each following robot enters a following mode at a start point of the following movement segment and follows a front cart to arrive at an aisle corresponding to the target storage location, and/or ends the following mode at an end point of the following movement segment and arrives at the target storage location to execute a goods retrieval or storage task;

wherein each shelving unit is provided with a plurality of vertical tracks for the robot to climb, a plurality of layers of storage locations are arranged corresponding to each of the vertical tracks, and the target storage locations corresponding to the robots in the robot fleet are in the same aisle; and the determining a planned path of each robot in the robot fleet comprises:

receiving to-be-executed tasks of the robot fleet sent by a server, wherein a number of the tasks matches a number of the robots in the robot fleet;

assigning a task to each robot based on a depth of the vertical track where the target storage location corresponding to each of the to-be-executed tasks is located, a height of the target storage location, and a position sequence of each robot in the robot fleet, wherein the depth corresponding to the vertical track is a distance between the vertical track and an aisle entrance; and determining the planned path of each robot based on the depth of the vertical track corresponding to the task assigned to the robot and the height of the target storage location.

2. The method according to claim 1, wherein the assigning a task to each robot based on a depth of the vertical track where the target storage location corresponding to each of the to-be-executed tasks is located, a height of the target storage location, and a position sequence of each robot in the robot fleet comprises:
   dividing the robot fleet into a plurality of sub-fleets based on the depths of the vertical tracks where the target storage locations corresponding to the to-be-executed tasks are located;
   assigning the to-be-executed tasks corresponding to the same vertical track to one of the sub-fleets; and
   assigning, for the sub-fleets, the to-be-executed tasks with the corresponding target storage locations in descending order of heights to the robots located from front to rear within the sub-fleet.

3. The method according to claim 2, wherein the determining the planned path of each robot based on the depth of the vertical track corresponding to the task assigned to the robot and the height of the target storage location comprises:
   planning first paths for the robots in each sub-fleet to arrive at the vertical tracks based on the depths of the vertical tracks where the target storage locations corresponding to the to-be-executed tasks are located; and
   planning, for each sub-fleet, second paths for the robots to arrive at the target storage locations based on the heights of the target storage locations corresponding to the to-be-executed tasks.

4. The method according to claim 1, further comprising:
   sending traveling state information of a current cart to a rear cart in real time within the following movement segment, so that the rear cart adjusts a steering angle based on the traveling state information of the leader robot after a preset time interval, to follow the leader robot.

5. The method according to claim 1, further comprising:
   sharing traveling state information of the leader robot in real time within the following movement segment through a self-organized fleet network, so that the following robots in the fleet adjust a steering angle based on the traveling state information of the leader robot after a time of $(N-1)$ T, to follow the front carts, wherein N is an order-position of each robot in the fleet, and T is a preset time interval.

6. The method according to claim 1, further comprising:
receiving a grouping signal sent by the server, wherein the grouping signal comprises grouping time information and grouping location information;
arriving at a grouping location based on the grouping signal;
sending arrival moment information to the server, so that the server determines the position sequence of each robot in the fleet based on the arrival moment information and the arrival moment information of other robots in the fleet, determines a role of each robot in the fleet based on the position sequence of the robots in the fleet, and sends role identification information to each robot;
receiving the role identification information sent by the server; and
determining that a current cart is the leader robot after the role identification information corresponding to the leader robot is received.

7. The method according to claim 1, further comprising:
receiving a grouping signal sent by the server, wherein the grouping signal comprises grouping time information and grouping location information;
arriving at a grouping location based on the grouping signal;
detecting whether another robot exists at the grouping location;
determining that a current cart is the leader robot if no another robot exists at the grouping location; and
sending a serial number of the current cart and the role identification information corresponding to the leader robot to the server, so that the server determines a role and a position sequence of each robot in the fleet based on the role identification information of the current cart and the role identification information sent by another robot belonging to the same robot fleet as the current cart.

8. A fleet control method, wherein the method is used for controlling a robot fleet, the robot fleet comprises a leader robot and at least one following robot, the method is applicable to the following robot, and the method comprises:
receiving a planned path sent by the leader robot, wherein the planned path is sent by the leader robot after determining the planned path of each robot in the robot fleet and determining a following movement segment in the planned path of each following robot based on the planned path of each robot, the planned path of each robot is used to indicate a movement path for the robot to move to a corresponding target storage location within a shelving unit region to execute a task, and the following movement segment comprises a movement segment located on the ground and/or a movement segment extending in a vertical direction; and
entering a following mode at a start point of the following movement segment and following a front cart to arrive at an aisle corresponding to the target storage location, and/or ending the following mode at an end point of the following movement segment and arriving at the target storage location to execute a goods retrieval or storage task;
wherein the entering a following mode at the start point of the following movement segment and following a front cart to arrive at an aisle corresponding to the target storage location, and/or ending the following mode at the end point of the following movement segment and arriving at the target storage location to execute a goods retrieval or storage task comprises:
extending a connecting mechanism forward at the start point of the following movement segment to connect to the front cart, and following the front cart to arrive at the aisle corresponding to the target storage location; and/or
cutting off the connection from the front cart at the end point of the following movement segment, retracting the connecting mechanism, and arriving at the target storage location to execute the goods retrieval or storage task.

9. The method according to claim 8, further comprising:
receiving traveling state information sent by the front cart in real time within the following movement segment;
updating a relevant parameter of a current cart based on the traveling state information of the front cart after a preset time interval to follow the front cart; and/or
sending traveling state information of the current cart to a rear cart in real time, so that the rear cart updates the relevant parameter of the current cart based on the traveling state information of the front cart after the preset time interval to follow the front cart.

10. The method according to claim 8, wherein the entering a following mode at a start point of the following movement segment and following a front cart to arrive at an aisle corresponding to the target storage location comprises:
detecting a distance to the front cart through a sensor in real time from the start point of the following movement segment; and
adjusting a movement state of a current cart in real time based on a detected distance to the front cart and a preset distance range, to maintain the distance to the front cart within the preset distance range, and following the front cart to arrive at the aisle corresponding to the target storage location.

11. The method according to claim 8, further comprising:
receiving a grouping signal sent by a server, wherein the grouping signal comprises grouping time information and grouping location information;
arriving at a grouping location based on the grouping signal;
sending arrival moment information to the server, so that the server determines a position sequence of each robot in the fleet based on the arrival moment information and the arrival moment information of other robots in the fleet, determines a role of each robot in the fleet based on the position sequence of the robots in the fleet, and sends role identification information to each robot;
receiving the role identification information sent by the server; and
determining that a current cart is the following robot after the role identification information corresponding to the following robot is received.

12. The method according to claim 8, further comprising:
receiving a grouping signal sent by a server, wherein the grouping signal comprises grouping time information and grouping location information;
arriving at a grouping location based on the grouping signal;
detecting whether another robot exists at the grouping location;
determining that a current cart is the following robot if another robot exists at the grouping location; and
sending a serial number of the current cart and role identification information corresponding to the following robot to the server, so that the server determines a role and a position sequence of each robot in the fleet based on the role identification information sent by each robot.

13. A fleet control method, wherein the method is used for controlling a robot fleet, the robot fleet comprises a leader robot and at least one following robot, the method is applicable to a server, and the method comprises:

determining a planned path of each robot in the robot fleet, wherein the planned path of each robot is used to indicate a movement path for the robot to move to a corresponding target storage location within a shelving unit region to execute a task; and determining a following movement segment in the planned path of each following robot, and sending the following movement segment to a corresponding following robot;

or sending the planned path of each robot to the leader robot, so that the leader robot determines a following movement segment in the planned path of each following robot, and sends the following movement segment to a corresponding following robot, so that each following robot enters a following mode at a start point of the following movement segment and follows a front cart to arrive at an aisle corresponding to the target storage location, and/or ends the following mode at an end point of the following movement segment and arrives at the target storage location to execute a goods retrieval or storage task, wherein the following movement segment comprises a movement segment located on the ground and/or a movement segment extending in a vertical direction;

wherein the method further comprises:

sending to-be-executed tasks to the leader robot after assigning the task to each robot based on a depth of a vertical track where the target storage location corresponding to each of the to-be-executed tasks of the robot fleet is located, a height of the target storage location, and a place of each robot in the robot fleet, and the depth corresponding to the vertical track is a distance between the vertical track and an aisle entrance; and wherein the planned path is determined based on the depth of the vertical track corresponding to the task assigned to the robot and the height of the target storage location.

14. The method according to claim 13, further comprising:

sending a grouping signal to a plurality of robots, so that the robots arrive at a grouping location based on the grouping signal, wherein the grouping signal comprises grouping time information and grouping location information;

receiving arrival moment information sent by the robots;

determining a position sequence of a corresponding robot in the fleet based on the arrival moment information sent by the robots; and determining a role of each robot in the fleet based on the position sequence of each robot in the fleet, and sending role identification information to each robot.

15. The method according to claim 13, further comprising:

sending a grouping signal to a plurality of robots, wherein the grouping signal comprises grouping time information and grouping location information;

receiving serial numbers of current carts and corresponding sent by the robots, wherein the serial numbers of the current carts and corresponding role identification information are sent by the robots after arriving at grouping location based on the grouping signal, detecting whether another robot exists at the grouping location, and determining roles of the current carts; and determining a role and a position sequence of each robot in the fleet based on the role identification information of each robot.

* * * * *